(12) United States Patent
Santoso et al.

(10) Patent No.: US 11,074,024 B2
(45) Date of Patent: Jul. 27, 2021

(54) MOBILE DEVICE FOR INTERACTING WITH DOCKING DEVICE AND METHOD FOR CONTROLLING SAME

(71) Applicant: Samsung Electronics Co., Ltd., Suwon-si (KR)

(72) Inventors: Dony Eko Santoso, Jakarta (ID); Mohamad Hanifan, Jakarta (ID); Ditta Khairunnisa, Jakarta (ID); Andreas Kosasih, Jakarta (ID); Rendy Wandarosanza, Jakarta (ID); Dickson Wijaya, Jakarta (ID)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/769,417

(22) PCT Filed: Dec. 13, 2018

(86) PCT No.: PCT/KR2018/015849
§ 371 (c)(1),
(2) Date: Jun. 3, 2020

(87) PCT Pub. No.: WO2019/117647
PCT Pub. Date: Jun. 20, 2019

(65) Prior Publication Data
US 2020/0301640 A1    Sep. 24, 2020

(30) Foreign Application Priority Data

Dec. 15, 2017  (ID) .............................. PID201709082

(51) Int. Cl.
*G06F 3/14* (2006.01)
*G06F 3/02* (2006.01)
(Continued)

(52) U.S. Cl.
CPC .......... *G06F 3/1423* (2013.01); *G06F 3/0202* (2013.01); *G06F 3/03547* (2013.01);
(Continued)

(58) Field of Classification Search
CPC .... G06F 1/1632; G06F 1/1616; G06F 1/1639; H04M 1/0272; H04N 9/3173
See application file for complete search history.

(56) References Cited

U.S. PATENT DOCUMENTS

2002/0030790 A1* 3/2002 Derryberry ........... G06F 1/1616
353/30
2002/0063855 A1* 5/2002 Williams .............. G06F 1/1639
353/122
(Continued)

FOREIGN PATENT DOCUMENTS

KR    20-2011-0003076 U    3/2011
KR    10-2013-0108755 A    10/2013
(Continued)

OTHER PUBLICATIONS

International Search Report dated Mar. 20, 2019, issued in International Application No. PCT/KR2018/015849.

*Primary Examiner* — Koosha Sharifi-Tafreshi
(74) *Attorney, Agent, or Firm* — Jefferson IP Law, LLP

(57) ABSTRACT

A mobile device and a method of controlling a docking device by the mobile device are provided. The method of controlling the docking device by the mobile device according to the present disclosure includes: connecting to the docking device, the docking device including a projector and a keyboard device; setting, as the mobile device connects to the docking device, the projector as an output unit for the mobile device and the keyboard device as an input unit for the mobile device; receiving, from the docking device, an input signal provided via the keyboard device included in the docking device; and transmitting, to the
(Continued)

docking device, output image data generated based on the received input signal, wherein the output image data provided to the docking device is projected outside the docking device via the projector.

16 Claims, 29 Drawing Sheets

(51) Int. Cl.
    *G06F 3/0354*      (2013.01)
    *G06F 3/0488*      (2013.01)
    *G06F 21/32*      (2013.01)
    *H04W 88/02*      (2009.01)

(52) U.S. Cl.
    CPC ............ *G06F 3/0488* (2013.01); *G06F 21/32* (2013.01); *H04W 88/02* (2013.01)

(56) References Cited

U.S. PATENT DOCUMENTS

| | | | |
|---|---|---|---|
| 2004/0019724 A1* | 1/2004 | Singleton, Jr. | G06F 1/1632 710/303 |
| 2007/0038785 A1* | 2/2007 | Varanda | G06F 1/1698 710/62 |
| 2007/0247794 A1* | 10/2007 | Jaffe | G11B 31/00 361/679.01 |
| 2008/0278894 A1* | 11/2008 | Chen | G06F 1/1632 361/679.01 |
| 2008/0285213 A1* | 11/2008 | Tan | G06F 3/021 361/679.3 |
| 2008/0304688 A1* | 12/2008 | Kumar | G06F 1/1656 381/370 |
| 2010/0246119 A1* | 9/2010 | Collopy | G06F 1/1616 361/679.55 |
| 2010/0309442 A1 | 12/2010 | Sadhu | |
| 2012/0170204 A1* | 7/2012 | Ahn | G06F 1/1632 361/679.41 |
| 2012/0194738 A1 | 8/2012 | Wang et al. | |
| 2012/0225622 A1* | 9/2012 | Kudrna | G06F 1/1632 455/41.2 |
| 2012/0245941 A1* | 9/2012 | Cheyer | H04L 63/10 704/246 |
| 2013/0162515 A1* | 6/2013 | Prociw | H04M 1/72409 345/156 |
| 2014/0059263 A1 | 2/2014 | Rosenberg et al. | |
| 2014/0075377 A1* | 3/2014 | Kang | H04M 1/72409 715/788 |
| 2014/0342669 A1 | 11/2014 | Zeung et al. | |
| 2016/0057266 A1 | 2/2016 | Zhao et al. | |
| 2016/0316184 A1 | 10/2016 | Kim et al. | |

FOREIGN PATENT DOCUMENTS

| | | |
|---|---|---|
| KR | 10-2013-0136293 A | 12/2013 |
| KR | 10-2014-0042365 A | 4/2014 |
| KR | 10-2014-0117919 A | 10/2014 |
| KR | 10-1600373 B1 | 3/2016 |

* cited by examiner

FIG. 8
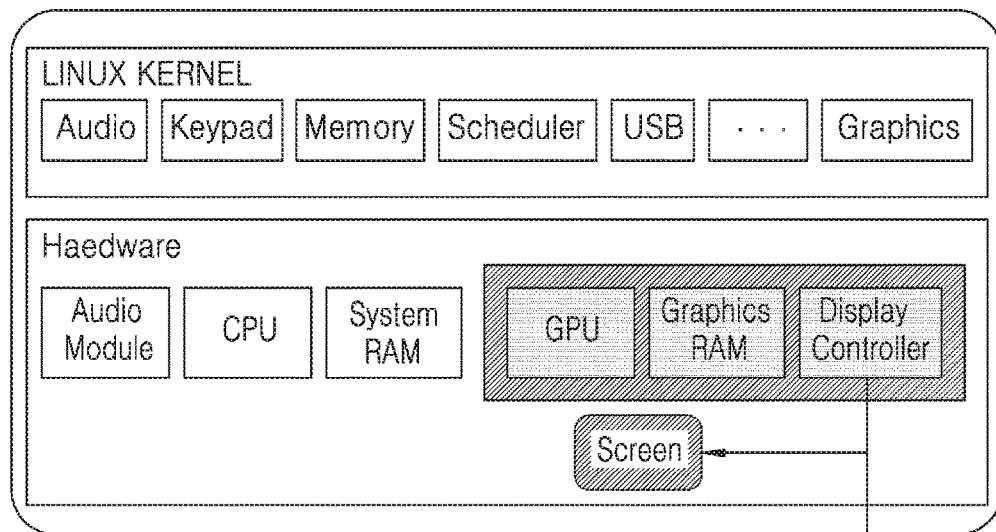
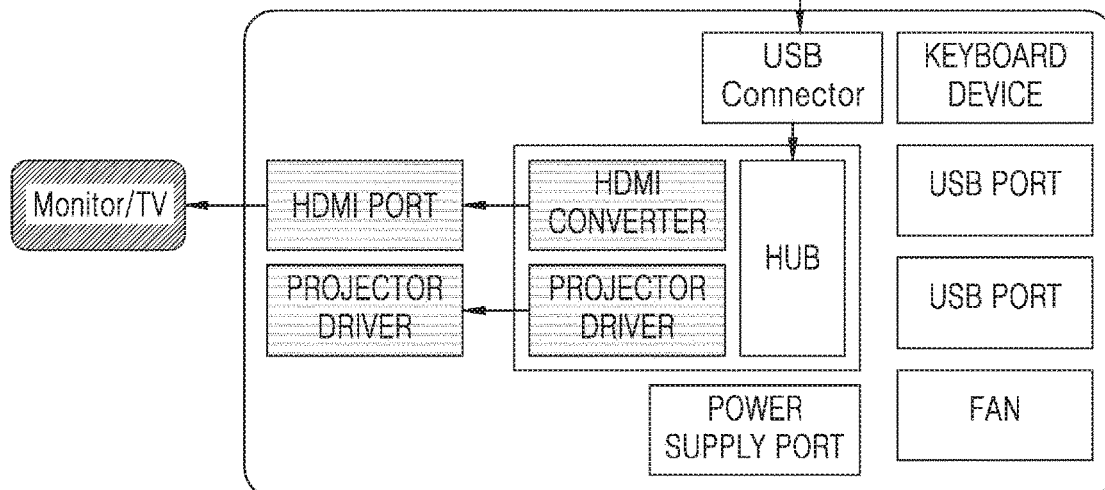

FIG. 11
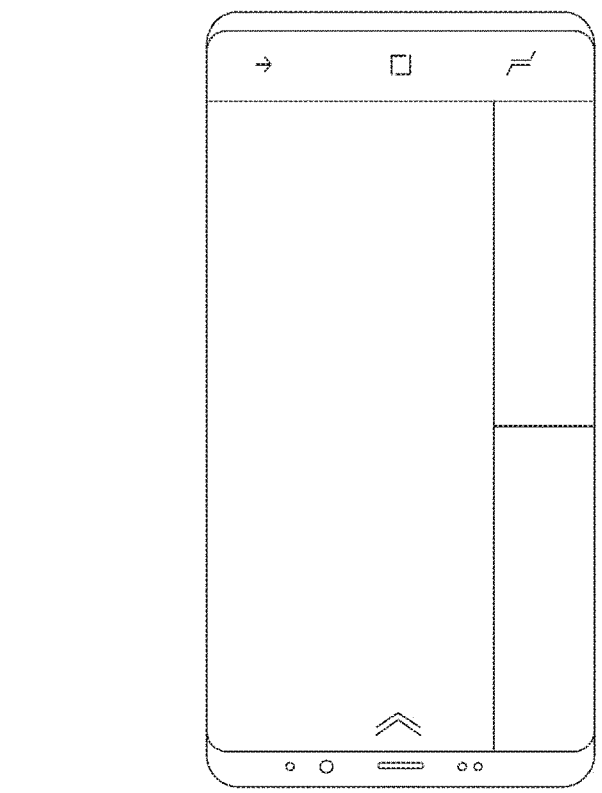
<TOUCHPAD IN DISPLAY OF MOBILE DEVICE>
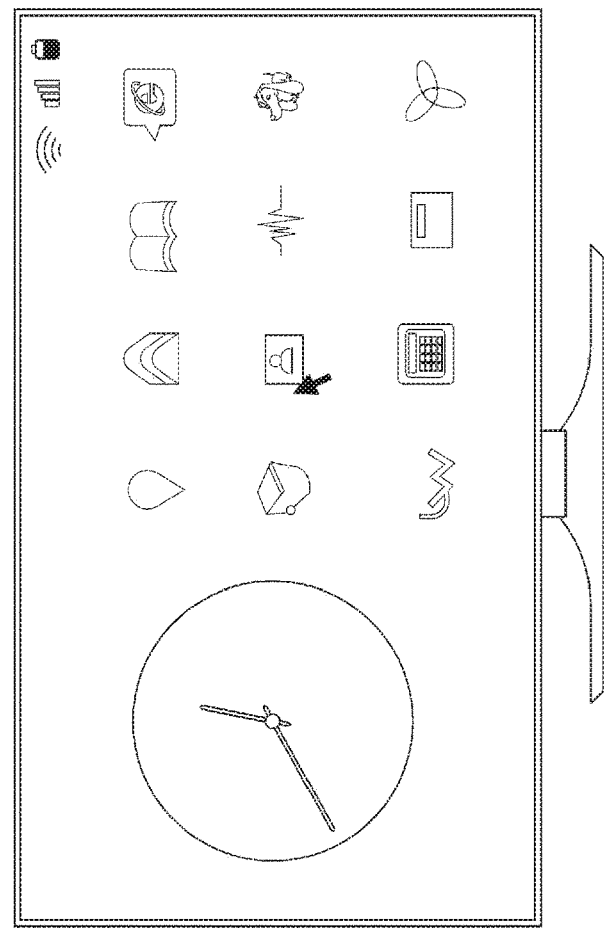
<HOME SCREEN WITH POINTER DISPLAYED ON AUXILIARY DISPLAY>

FIG. 13

| Action | Event | Representation |
|---|---|---|
| Press and Hold then Move | Drag and Drop | |
| Swipe up with two finger | Scroll up | |
| Swipe down with two finger | Scroll down | |
| Pinch | Zoom out | |
| Spread | Zoom in | |

| Action | Event | Representation |
|---|---|---|
| Tap on Left Button | Left Click | |
| Tap on Right Button | Right Click | |
| Tap on Touchpad | Left Click | |
| Touch and Move | Move Cursor | |

FIG. 16

| Action | Event | Representation |
|---|---|---|
| Swipe left and right | Swipe left and right | |
| Scroll up and down | Scroll up and down | |
| Tapping with one finger | Left click | |

| Action | Event | Representation |
|---|---|---|
| Tapping with two fingers | Right click | |
| Two fingers movement | Tap and hold | |
| Two fingers pinch | Pinch | |
| Two fingers zoom | Zoom | |

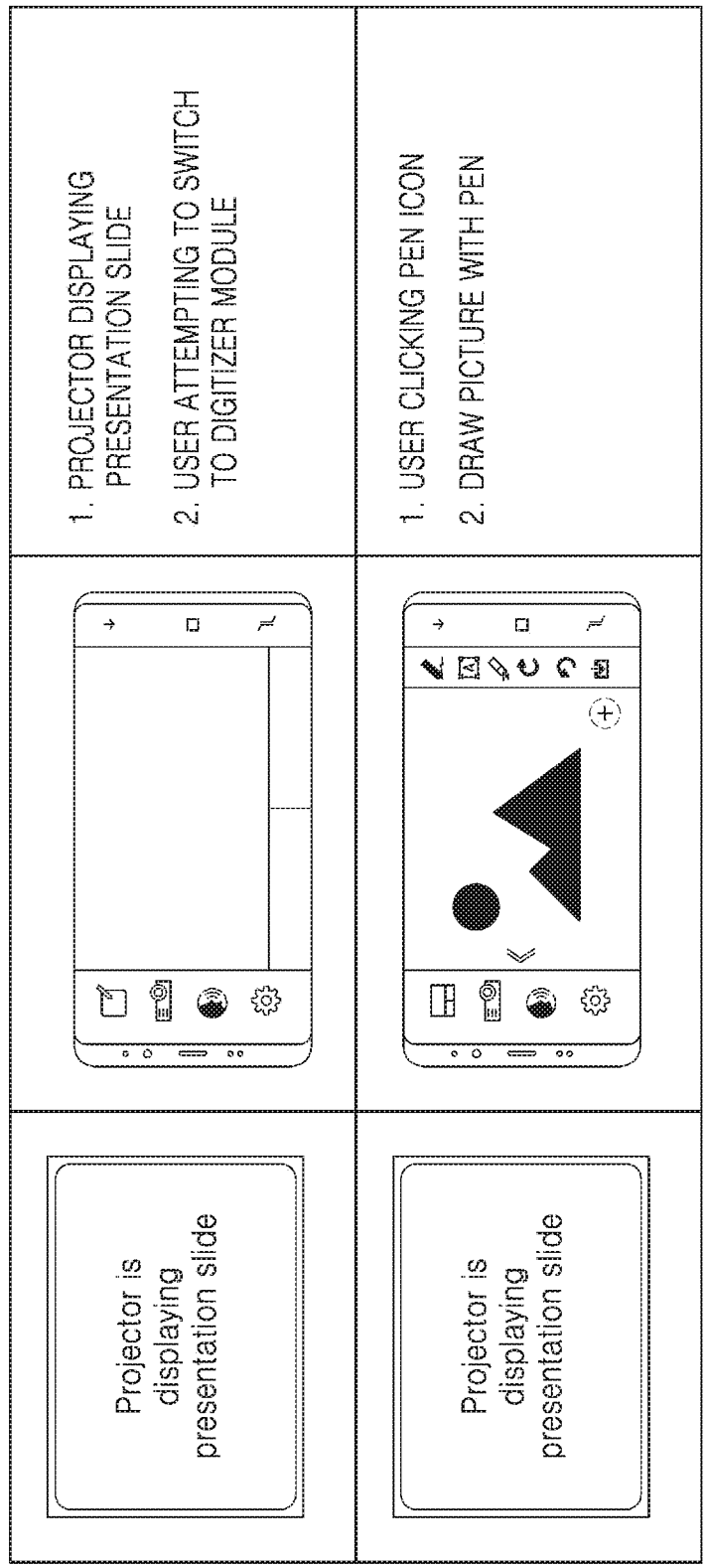

MOBILE DEVICE FOR INTERACTING WITH DOCKING DEVICE AND METHOD FOR CONTROLLING SAME

TECHNICAL FIELD

The present disclosure relates to a mobile device for interacting with a docking device and a method of controlling the docking device.

BACKGROUND ART

As mobile computing has advanced, mobile devices such as smartphones or tablet PCs have been increasingly used in recent years. Most simple computing processes may be performed by a mobile device. With the development of mobile devices and technologies, many personal electronic devices and/or mobile devices have become able to process more complex tasks. The capabilities of such devices are often deemed to be similar to the capabilities of a computer.

There are patents and patent publications seeking methods of providing a docking system for a mobile device. However, none of the inventions described therein combine various hardware components and/or intelligent systems to provide a new docking system.

DESCRIPTION OF EMBODIMENTS

Technical Problem

The present disclosure provides a mobile computing environment by connecting a hardware docking device including a keyboard device, a projector, and an input/output unit with a mobile device including a mobile application for operating as a central processing module.

Solution to Problem

As a solution to the technical problems, according to an aspect of the present disclosure, a method of controlling a docking device by a mobile device includes: connecting to the docking device including a projector and a keyboard device; setting, as the mobile device connects to the docking device, the projector as an output unit for the mobile device and the keyboard device as an input unit for the mobile device; receiving, from the docking device, an input signal provided via the keyboard device included in the docking device; and transmitting, to the docking device, output image data generated based on the received input signal, wherein the output image data provided to the docking device is projected outside the docking device via the projector.

According to another aspect of the present disclosure, a mobile device for controlling a docking device includes: a display; an input/output unit connected to the docking device; a memory storing one or more instructions; and at least one processor configured to execute the stored one or more instructions to: connect to the docking device including a projector and a keyboard device; set, as the mobile device connects to the docking device, the projector as an output unit for the mobile device and the keyboard device as an input unit for the mobile device; receive, from the docking device, an input signal provided via the keyboard device included in the docking device; and transmit output image data generated based on the received input signal to the docking device, wherein the output image data provided to the docking device is projected outside the docking device via the projector.

According to another aspect of the present disclosure, a computer program apparatus includes a computer-readable recording medium having recorded thereon a program for executing the method according to the aspect of the disclosure on a computer.

Advantageous Effects of Disclosure

According to the present disclosure, it is possible to provide a mobile computing environment via a connection between a hardware docking device including a keyboard device, a projector, and an input/output unit and a mobile device including a mobile application for operating as a central processing module.

BRIEF DESCRIPTION OF DRAWINGS

FIG. 8 illustrates a docking system using a dual display mode according to some embodiments.

FIG. 11 illustrates a screen of a mobile device and a screen of an external device connected to a docking device, according to some embodiments.

FIG. 13 illustrates classification of events from a touchpad of a mobile device according to some embodiments.

FIG. 16 illustrates classification of off screen gesture events on a mobile device according to some embodiments.

FIG. 29 illustrates an overview of a digitizer module of a docking system for a business presentation, according to some embodiments.

BEST MODE

Figure 1:
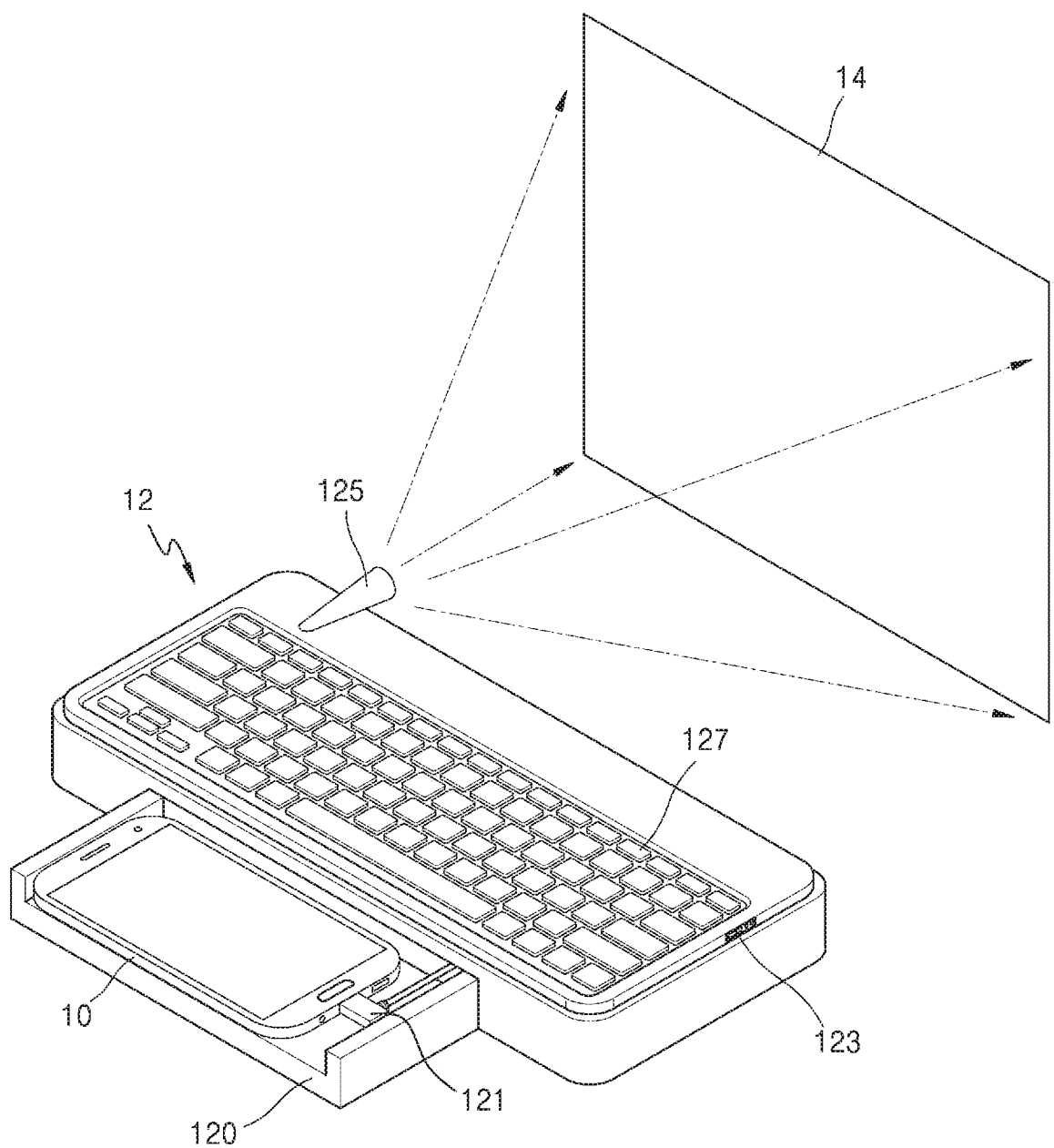
FIG. 1 illustrates a docking system according to some embodiments.

According to some embodiments of the present disclosure, a method of controlling a docking device by a mobile device includes: connecting to the docking device including a projector and a keyboard device; setting, as the mobile device connects to the docking device, the projector as an output unit for the mobile device and the keyboard device as an input unit for the mobile device; receiving, from the docking device, an input signal provided via the keyboard device included in the docking device; and transmitting, to the docking device, output image data generated based on the received input signal, wherein the output image data provided to the docking device is projected outside the docking device via the projector.

According to some embodiments, a mobile device for controlling a docking device includes: a display; an input/output unit connected to the docking device; a memory storing one or more instructions; and at least one processor configured to execute the stored one or more instructions to: connect to the docking device including a projector and a keyboard device; set, as the mobile device connects to the docking device, the projector as an output unit for the mobile device and the keyboard device as an input unit for the mobile device; receive, from the docking device, an input signal provided via the keyboard device included in the docking device; and transmit output image data generated based on the received input signal to the docking device, wherein the output image data provided to the docking device is projected outside the docking device via the projector.

According to some embodiments, a computer program apparatus includes a computer-readable recording medium having recorded thereon a program for executing a method of controlling a docking device by a mobile device on a computer.

MODE OF DISCLOSURE

Advantages and features of the present disclosure and methods of accomplishing the same will be more readily appreciated by referring to the following description of embodiments of the disclosure and the accompanying drawings. However, the disclosure may be embodied in many different forms and should not be construed as being limited to the embodiments of the disclosure set forth herein. Rather, the embodiments of the disclosure are provided so that the disclosure will be thorough and complete and will fully convey the concept of the disclosure to those of ordinary skill in the art.

Terms used herein will now be briefly described, and the present disclosure will be described in detail.

As the terms used herein, general terms that are currently widely used are selected by taking functions in the disclosure into account, but the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

As used herein, singular expressions are intended to include plural expressions as well, unless the context clearly indicates them as singular.

Embodiments of the disclosure will now be described more fully hereinafter with reference to the accompanying drawings so that they may be easily implemented by one of ordinary skill in the art. In addition, parts not related to the description are omitted to clarify the present disclosure.

FIG. 1 illustrates a docking system according to some embodiments.

Referring to FIG. 1, according to some embodiments of the present disclosure, a docking device 12 of the docking system may include an input/output (I/O) port 123, a projector 125, and a keyboard device 127 For example, a mobile device 10 may be inserted into the docking device 12 via an insertion port 120 into which the mobile device 10 is insertable.

The mobile device 10 may be connected to the docking device 12 via a docking port 121 of the docking device 12. For example, the mobile device 10 may be connected to the docking port 121 of the docking device 12 by using wired communication via a charging port of the mobile device 10.

As the mobile device 10 is connected to the docking device 12, the projector 125 may be set as an output unit for the mobile device 10. Moreover, as the mobile device 10 is connected to the docking device 12, the keyboard device 127 may be set as an input unit for the mobile device 10. The mobile device 10 may receive an input signal 12 provided via the keyboard device 127 from the docking device 12.

The mobile device 10 may transmit output image data generated based on the received input signal to the docking device 12. The output image data provided to the docking device 12 may be projected outside the docking device 12 via the projector 125.

Figure 2:
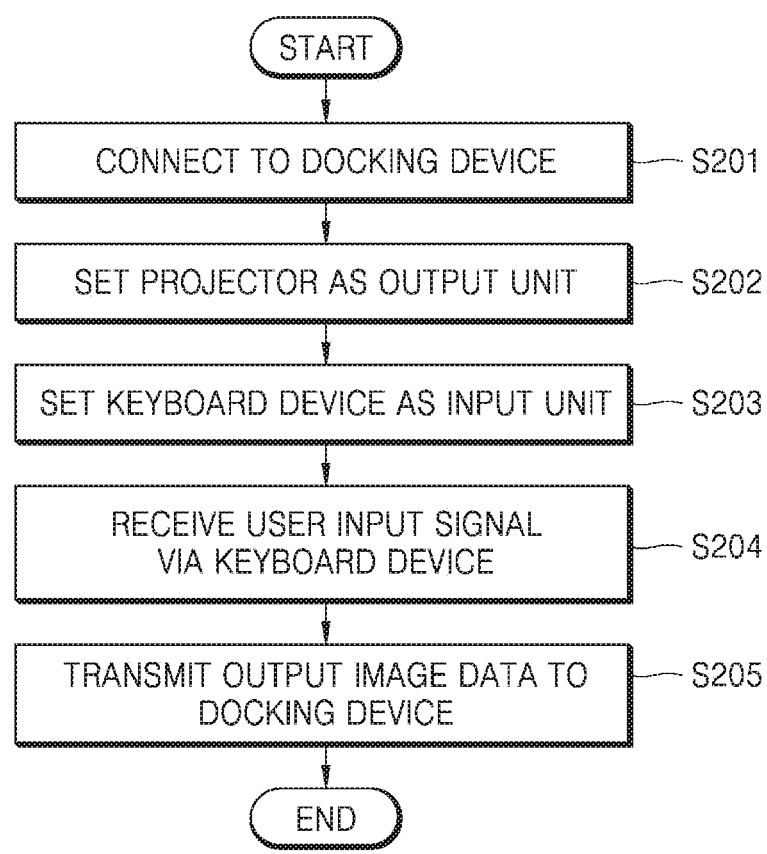
FIG. 2 is a flowchart of a method of controlling a docking device by a mobile device, according to some embodiments.

FIG. 2 is a flowchart of a method of controlling the docking device by the mobile device, according to some embodiments.

Referring to FIG. 2, according to some embodiments, in operation S201, the mobile device 10 may connect to the docking device 12 including the projector and the keyboard device 127.

In operation S202, as the mobile device 10 connects to the docking device 12, the mobile device 10 may set the projector 125 as an output unit for the mobile device 10.

For example, the mobile device 10 may set its display as a main display and the projector 125 as an auxiliary display.

For example, the mobile device 10 may determine whether there is an external display connected thereto via the connector port 123 of the docking device 12. When the external display exists, the mobile device 10 may set the external display as an auxiliary display. The mobile device 10 may transmit output image data to the external display set as the auxiliary display.

In operation S203, as the mobile device 10 connects to the docking device 12, the mobile device 10 may set the keyboard device 127 as an input unit for the mobile device 10.

For example, when the display of the mobile device 10 is a touch screen, the mobile device 10 may set the display as an auxiliary input unit. The mobile device 10 may display a user input interface on the display of the mobile device 10 set as the auxiliary input unit.

For example, the display of the mobile device 10 set as the auxiliary input unit may be used as an input unit for controlling a pointer in an image output from the docking device 12.

For example, the display of the mobile device 10 set as the auxiliary input unit may be used as an input unit for controlling movement of a pointer in an image output from the docking device 12 based on user input coordinates on a touch screen.

In operation S204, the mobile device 10 may receive, from the docking device 12, an input signal provided via the keyboard device 127 included in the docking device 12.

In operation S205, the mobile device 10 may transmit output image data generated based on the received input signal to the docking device 12.

Figure 3:
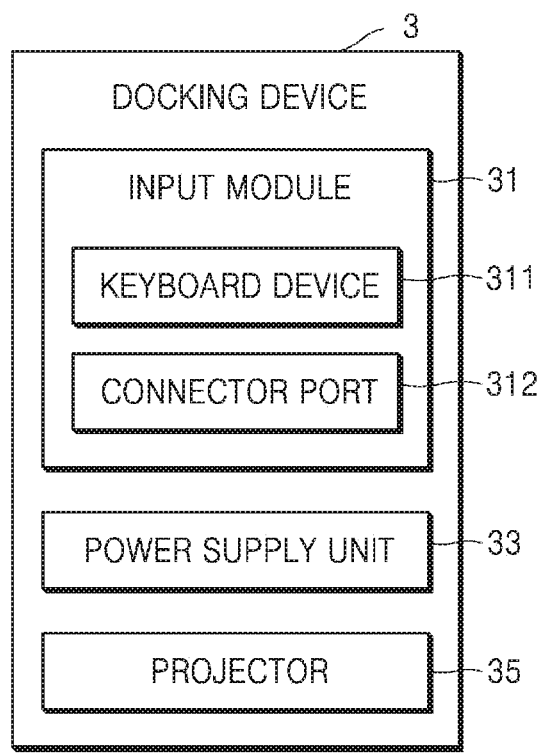
FIG. 3 illustrates a configuration of a docking device according to some embodiments.

FIG. 3 illustrates a configuration of a docking device according to some embodiments.

Referring to FIG. 3, the configuration of a docking device 3 according some embodiments is shown. As shown in FIG. 3, according to some embodiments, the docking device 3 may include an input module having a keyboard device 311 and an I/O port 312 and a projector 35. The docking device 3 may further include a power supply unit 33 for supplying power to at least one of the docking device 3, a mobile device, and an external device connected to the docking device 3.

Figure 4:
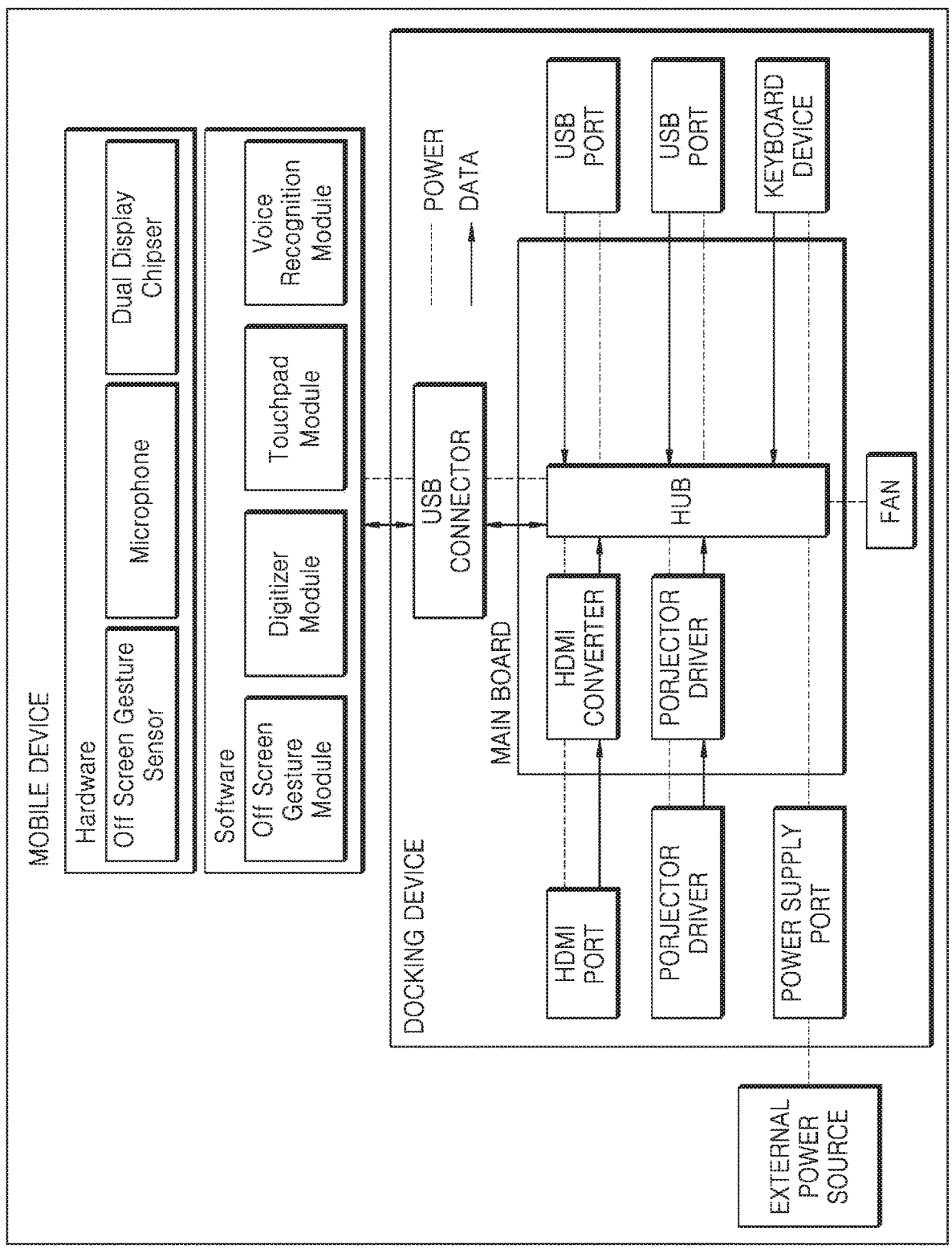
FIG. 4 illustrates a configuration of a docking system according to some embodiments.

FIG. 4 illustrates a configuration of a docking system according to some embodiments.

The entire docking system of the present disclosure includes two main components, i.e., the mobile device 10 on which an application is running and the docking device 12. The mobile device may include an operating system and an application that support the docking system. The application switches the mobile device 10 to an input device and connects the mobile device 10 to the docking device 12 via a docking port.

Referring to FIG. 4, in the docking system according to some embodiments, the mobile device 10 and the docking device 12 connected via a universal serial bus (USB) port may exchange power and/or data with each other. Data from the keyboard device 127 included in the docking device 12 and the projector 125 may be input to the mobile device 10 via a hub of the docking device 12.

Figure 5:
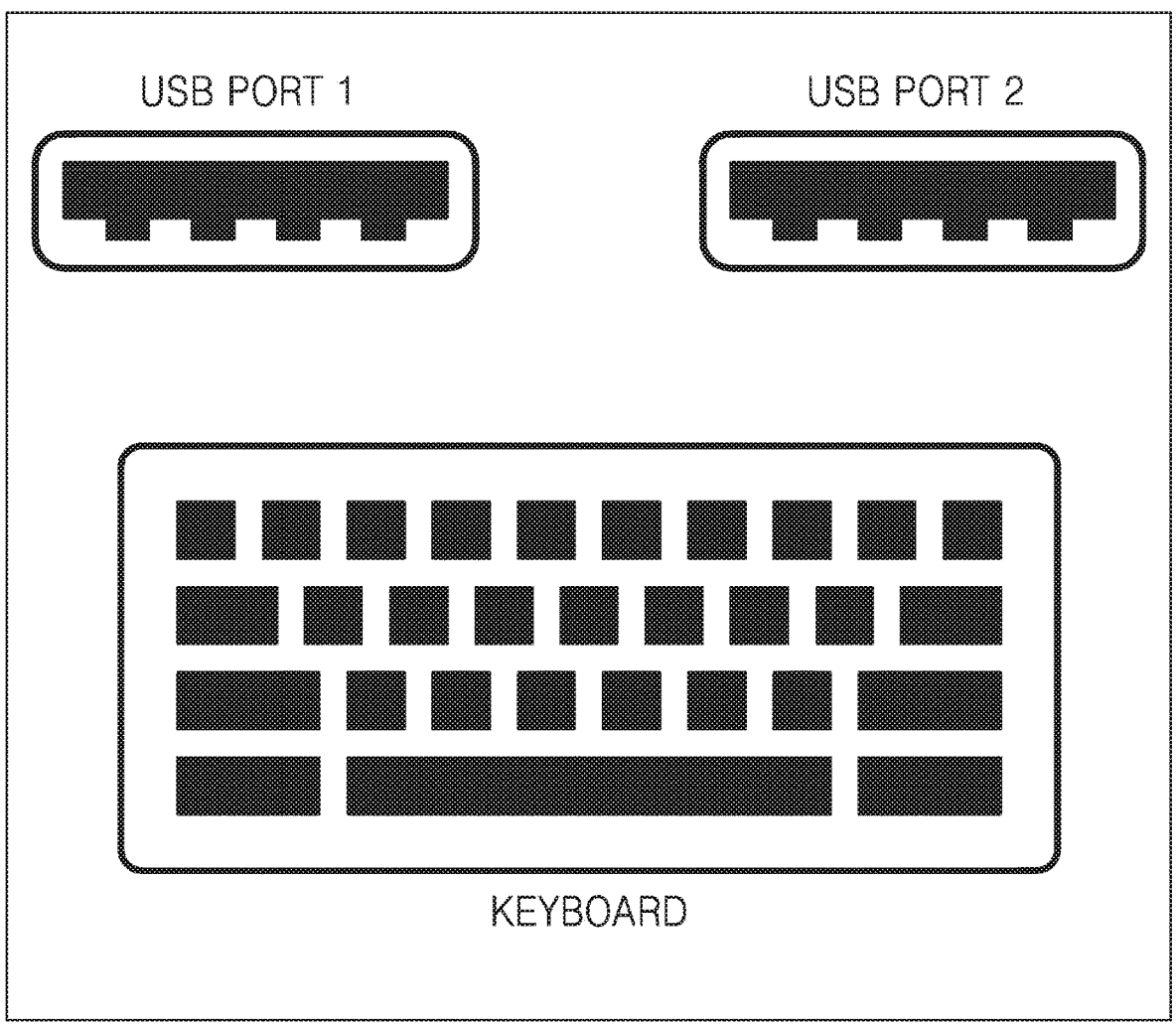
FIG. 5 illustrates a user input module according to some embodiments.

FIG. 5 illustrates a user input module according to some embodiments.

According to some embodiments, the user input module may include the keyboard device 127 and the connector port 123. The keyboard device 127 of the user input module may receive an input signal that is provided by the user to the mobile device 10.

The connector port 123 of the user input module may be a USB port. The connector port 123 may process all inputs received from external devices. The main purpose of the user input module is to receive inputs from computer external devices such as a pointing device, a keyboard, a disk drive, etc. All data from the user input module may be transmitted to a main hub, and all received data may thereafter be transmitted to the mobile device 10.

Figure 6:
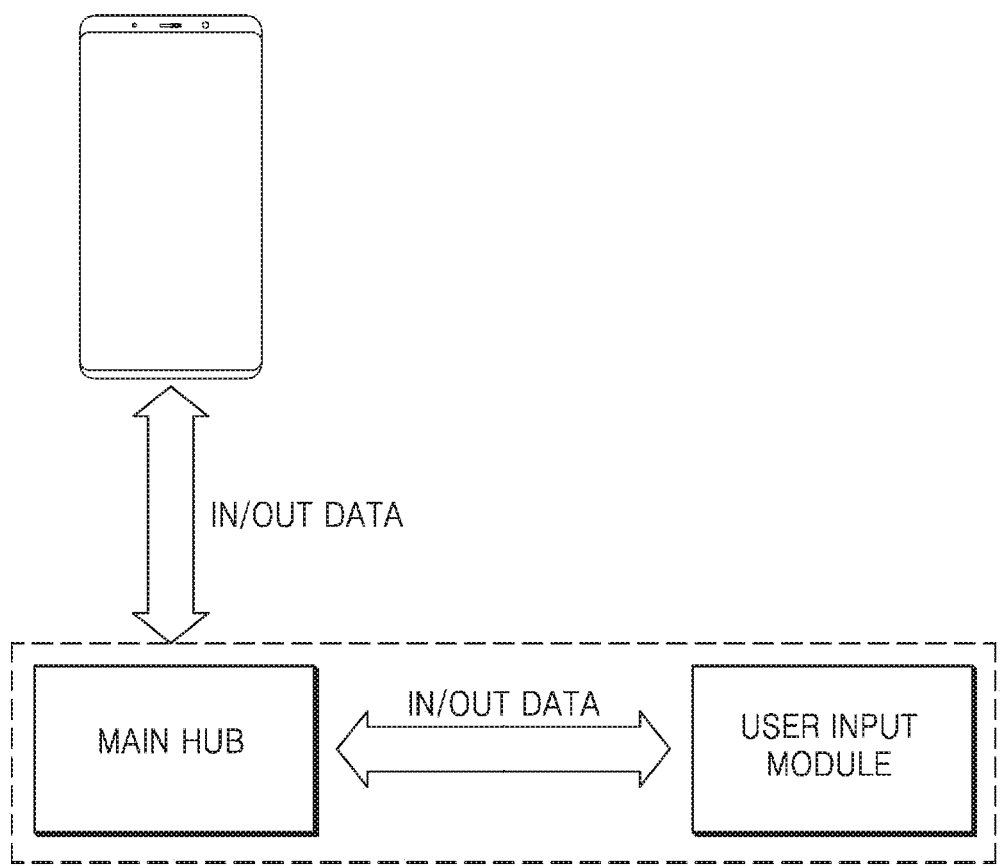
FIG. 6 illustrates a method of interacting between a mobile device and a user input module according to some embodiments.

FIG. 6 illustrates a method of interacting between the mobile device 10 and a user input module according to some embodiments.

In detail, FIG. 6 is a flowchart of an interaction between the mobile device 10 and an input module of the docking device 12. A flow of data is a bidirectional flow of data, and the user may not only input data to the mobile device 10 but also receive data back from the mobile device 10 via an external device when the external device is able to receive the data again.

Figure 7:
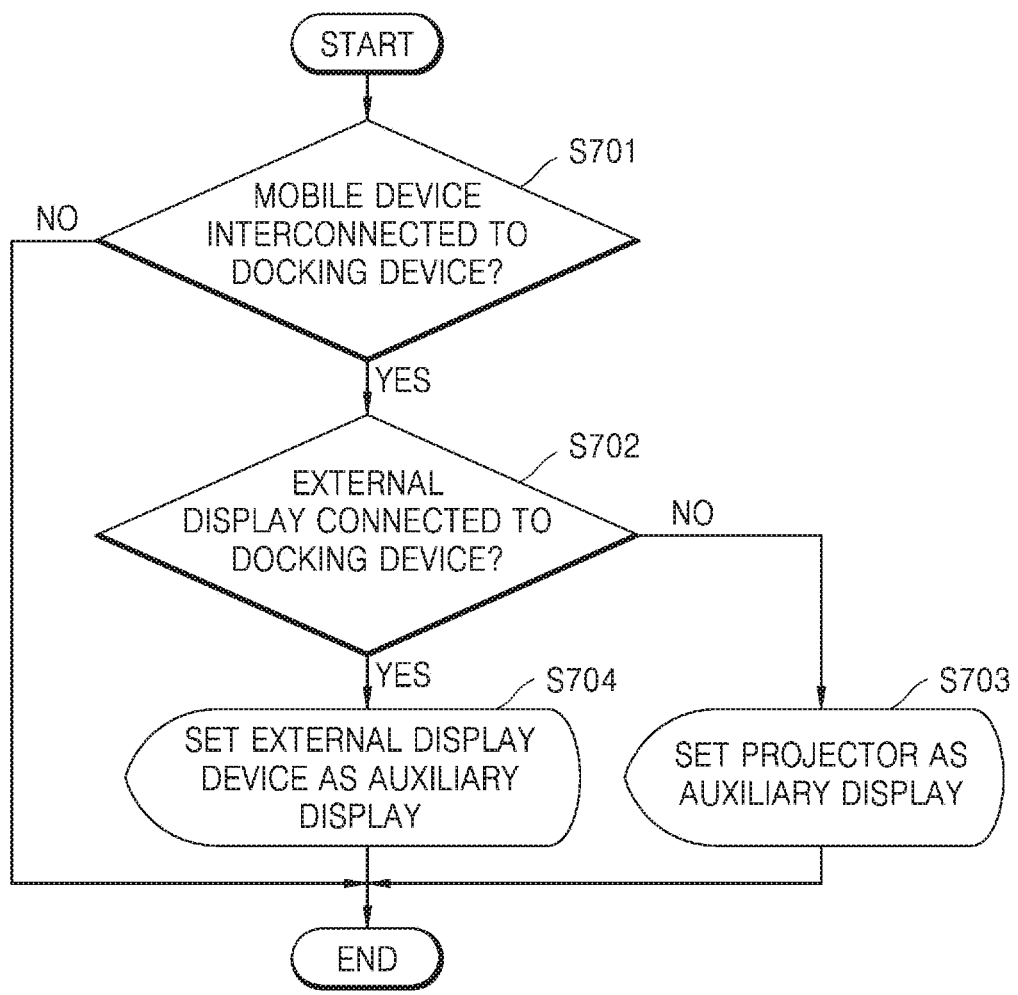
FIG. 7 is a flowchart of a method of automatically detecting a projector according to some embodiments.

FIG. 7 is a flowchart of a method of automatically detecting a projector according to some embodiments.

A docking system of the present disclosure may support a multi-screen in a dual display mode. A main display is included in the mobile device 10, and an auxiliary display is included in an external display, such as a monitor and a TV, connected to the docking device 12 via the connector port 123. All mobile application programs (except for a docking application) are always executed on the auxiliary display.

Referring to FIG. 7, in operation S701, the mobile device 10 may determine whether it is interconnected to the docking device 12.

When it is determined that the mobile device 10 is interconnected to the docking device 12, in operation S702, the mobile device 10 may check whether an external display device is connected to the docking device 12.

When the external display device is not connected to the docking device 12 as a result of the checking, the mobile device 10 may set the projector 125 included in the docking device 12 as an auxiliary display in operation S703.

Otherwise, when the external display device is connected to the docking device 12, in operation S704, the mobile device 10 may set the external display device connected to the docking device 12 as the auxiliary display.

FIG. 8 illustrates a docking system using a dual display mode according to some embodiments.

Referring to FIG. 8, to support the dual display mode, the docking device 12 may include the projector 125 as a built-in auxiliary display. Furthermore, the docking device 12 may include the connector port 123 for using an external display device such as a monitor or TV. For example, the mobile device 10 may activate only one of the projector 125 of the docking device 12 and the external display device.

For example, when the external display device is not connected to the docking device 12, the mobile device 10 sets the projector 125 of the docking device 12 as an auxiliary display and projects output image data via the projector 125.

All settings related to the projector 125 (e.g., a focal point, brightness, etc.) may be processed via a setting menu for an application on the mobile device 10. For example, because the docking system including the mobile device 10 and the docking device 12 is portable, a distance from the built-in projector 125 to a projection screen may vary according to circumstances. For a lens of the built-in projector 125, focal point setting for sharply displaying a screen may be performed via an application for the mobile device 10.

Moreover, when the mobile device 10 detects that an external display device is connected to the docking device 12, the mobile device 10 may set the external display device connected to the docking device 12 as an auxiliary display. For example, when the mobile device 10 detects that the external display device is connected to the docking device 12, the mobile device 10 may switch off the projector 125 included in the docking device 12 and display output image data via the external display device.

The external display device may be connected to the docking device 12 via the connector port 123 included in the docking device 12, such as an HDMI port. When the user prefers to have an image displayed on a monitor screen or the projector 125 with a high resolution, the mobile device 10 may use the external display device. The HDMI port may be provided to expand a display functionality of the docking system.

All external devices connected to the docking system require power during operation. An external power supply may be connected to the docking system 12 via power supply port. The power supplied to the docking device 12 needs to comply with requirements of all connected external devices.

Moreover, a fan in the docking device 12 may be used to lower the temperature of the mobile device 10 when an advanced mobile docking system is operating. For example, the fan in the docking device 12 may be located relatively close to where the mobile device 10 is located.

In the present disclosure, the mobile device 10 may be used as at least one of a central processing unit and an input unit of the docking system. Inputs via the mobile device 10 are mainly focused on pointing, digitizer, and voice related commands. For example, an input interface may be displayed on a display of the mobile device 10, i.e., a main display thereof while a mouse pointer may be displayed on an auxiliary display. Broadcast messages may be used in interactions between the auxiliary display and the main display.

A touchpad and a digitizer of the mobile device 10 may be switched with each other on a single screen, and a voice command may be executed as a background service. The mobile device 10 is unable to use a digitizer module when a touchpad module is activated and use the touchpad module when the digitizer module is activated. A voice recognition module may be executed as a background service regardless of the touchpad module and the digitizer module.

Figure 9:
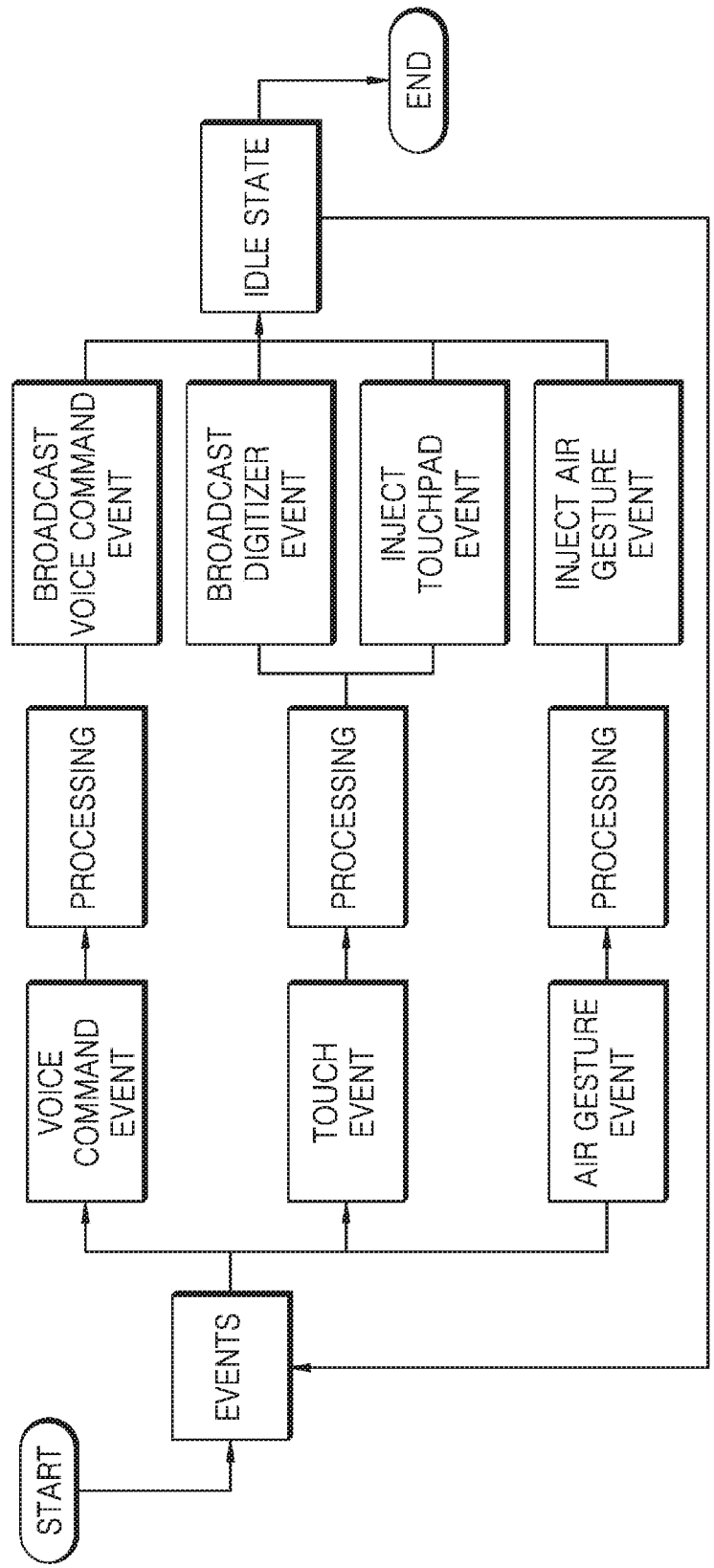
FIG. 9 is a flowchart illustrating input events according to some embodiments.

FIG. 9 is a flowchart illustrating input events according to some embodiments.

Referring to FIG. 9, according to some embodiments, when a broadcast is transmitted due to processing on a voice command event, a touch event, and an air gesture event, the mobile device 10 may automatically route broadcasts to an application for the mobile device 10 to receive the particular type of broadcast.

Figure 10:
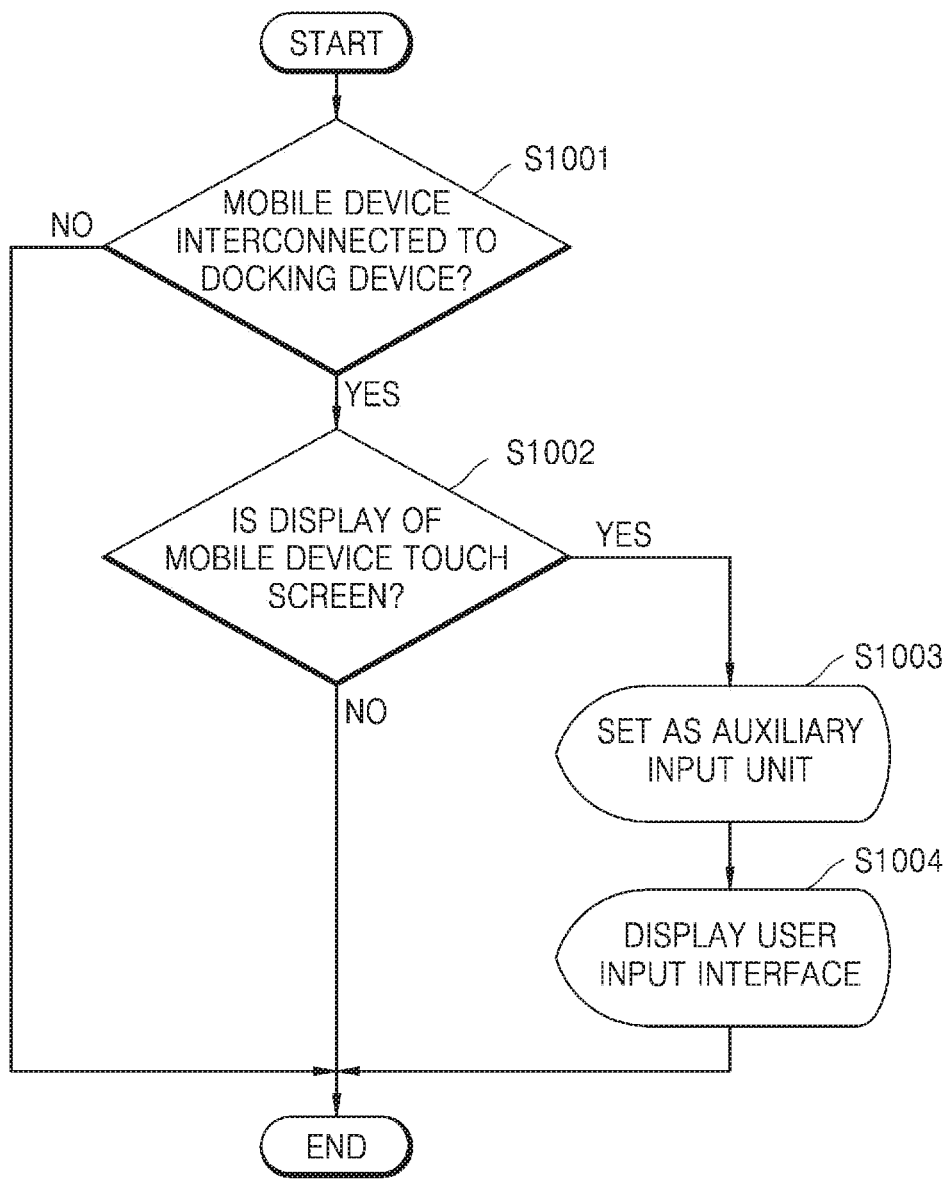
FIG. 10 is a flowchart of a method of setting a display of a mobile device as an auxiliary input unit, according to some embodiments.

FIG. 10 is a flowchart of a method of setting a display of the mobile device 10 as an auxiliary input unit, according to some embodiments.

Referring to FIG. 10, in operation S1001, the mobile device 10 may determine whether it is interconnected to the docking device 12.

When it is determined that the mobile device 10 is interconnected to the docking device 12, in operation S1002, the mobile device 10 may check whether a display of the mobile device 10 is a touch screen.

When the display of the mobile device 10 is a touch screen in operation S1002, the mobile device may set the display of the mobile device 10 as an auxiliary input unit in operation S1003, and may display a user input interface on the display of the mobile device 10 in operation S1004.

FIG. 11 illustrates a screen of the mobile device and a screen of an external device connected to the docking device, according to some embodiments.

Referring to FIG. 11, the mobile device 10 may include a touchpad module for improving the portability of a docking system. The touchpad module may be used as a pointing device for triggering simple touch-based interactions such as tap, press, swipe, pinch, and spread.

The touchpad module may track touch gestures and map the tracked touch gestures to left click, right click, tapping, up/down scroll, drag-and-drop, and zoom in/output commands. For the mobile device 10 connected to the docking device 12, the touchpad module may be activated on a main display while a mouse pointer may be displayed on an auxiliary display.

Figure 12:
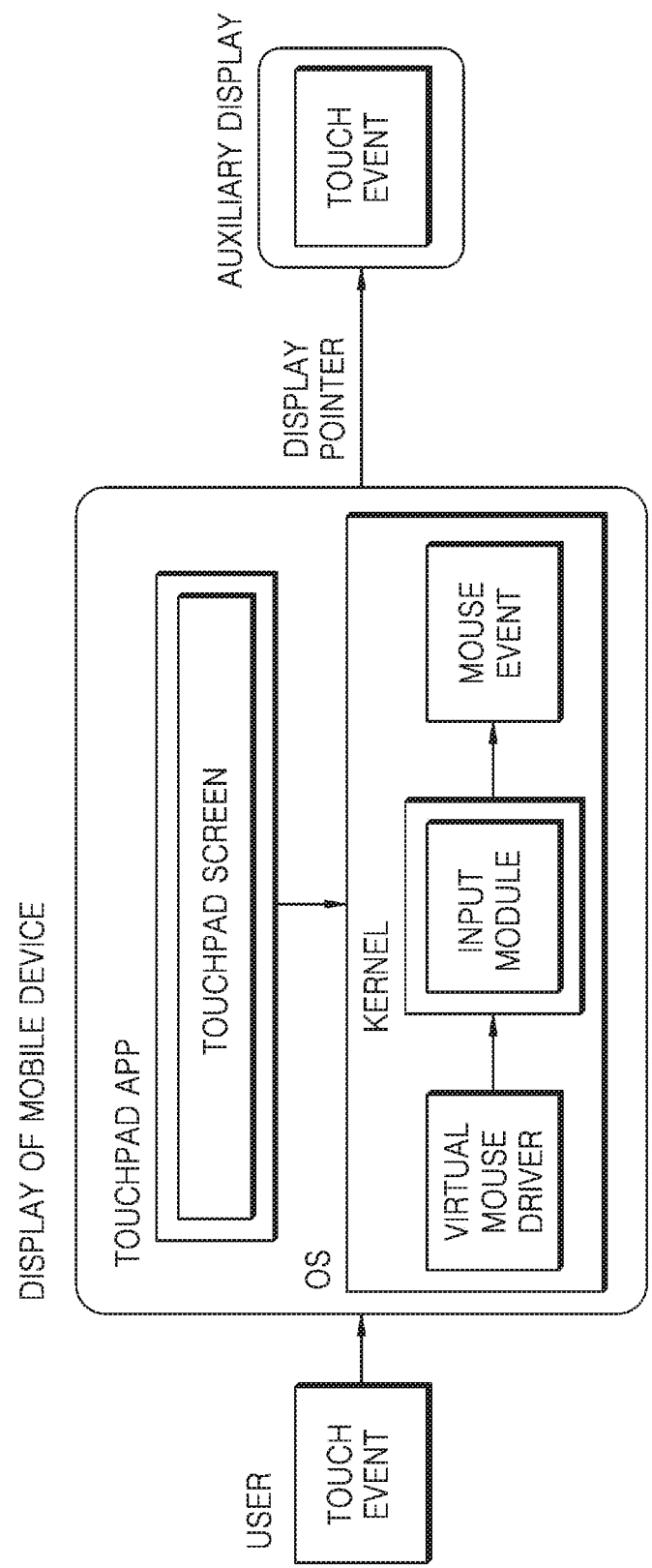
FIG. 12 is a flowchart illustrating a flow of an operation of a touchpad according to some embodiments.

FIG. 12 is a flowchart illustrating a flow of an operation of a touchpad according to some embodiments, and FIG. 13 illustrates classification of events from a touchpad of a mobile device according to some embodiments.

Referring to FIG. 12, a user's touch operation may be detected by a touchpad module. A virtual mouse driver may communicate with a kernel based on a mouse event. The touchpad module may operate by collecting operation inputs via a gesture sensor on a screen. After a touch operation is performed by the user, an operation corresponding to a touch event may be activated on an auxiliary display, based on touch events classified as shown in FIG. 13.

Figure 14:
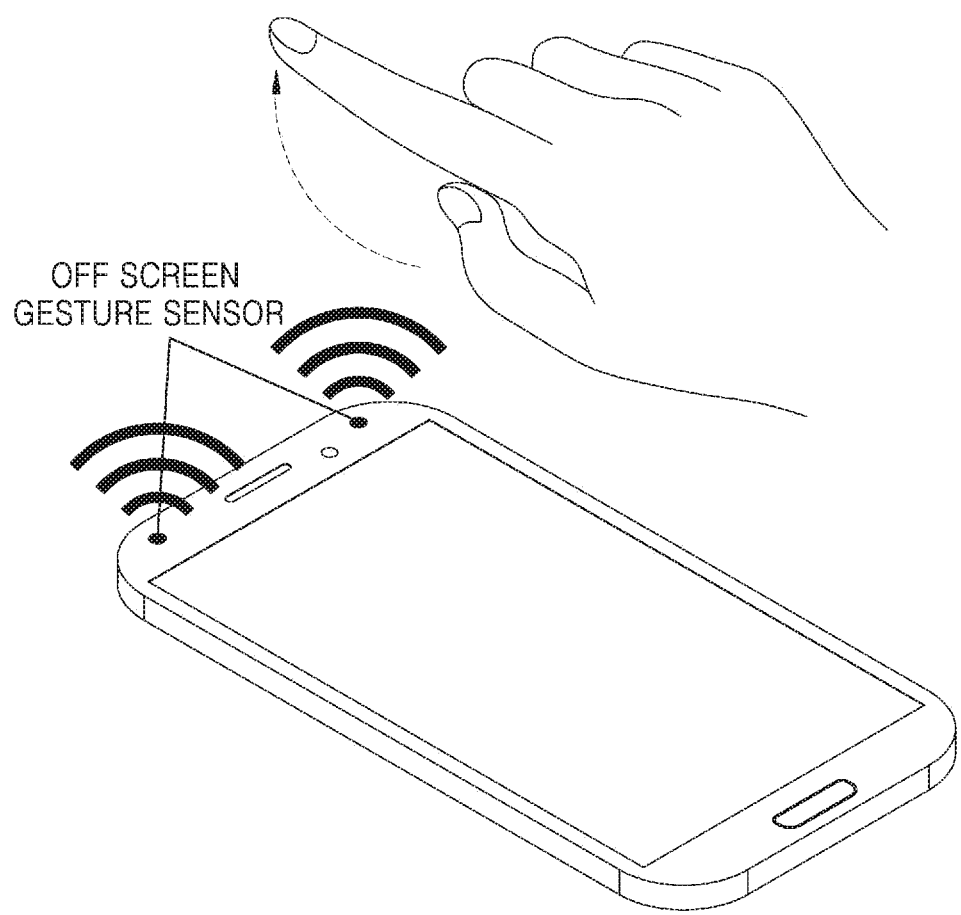
FIG. 14 illustrates an off screen gesture sensor according to some embodiments.
Figure 15:
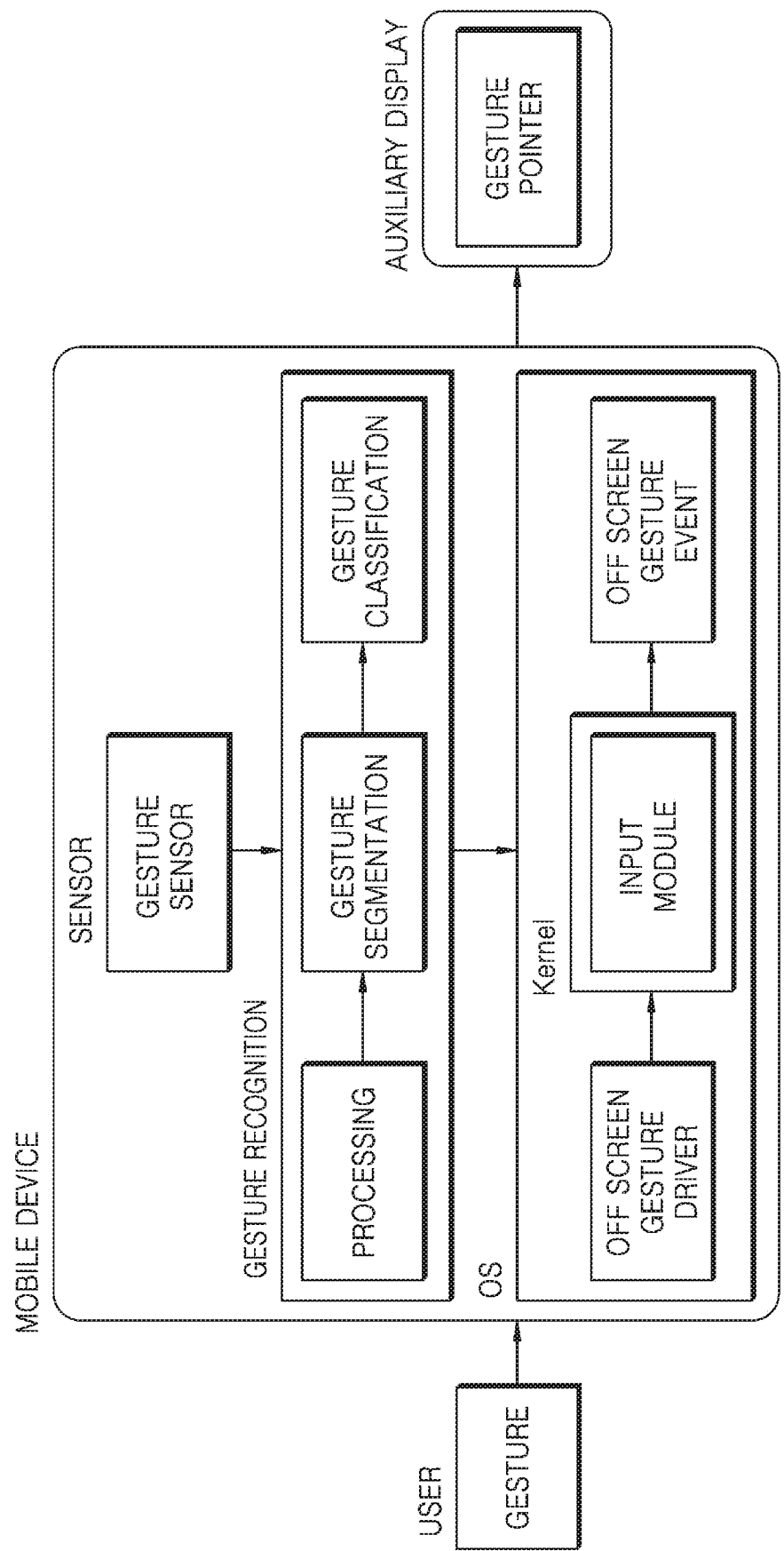
FIG. 15 is a flowchart illustrating a flow of an operation of an off screen gesture sensor according to some embodiments.

FIG. 14 illustrates an off screen gesture sensor according to some embodiments, and FIG. 15 is a flowchart illustrating a flow of an operation of an off screen gesture sensor according to some embodiments.

An off screen gesture sensor may recognize a user's hand gesture without touching a screen. An off screen gesture recognition module may operate as an input unit to allow a user to interact with a docking system without having to touch the screen.

For example, the off screen gesture sensor is a sensor for detecting a gesture made by a user's hand and may include a dual front infrared (IR) sensing camera. An IR illumination device may be used as a light source for accurately detecting a subject regardless of the intensity of ambient light. A camera may be separated from the subject by a predetermined distance, and an IR illuminator may be located between the subject and the camera.

For example, the off screen gesture sensor may reconstruct a three-dimensional (3D) image by capturing a stereoscopic image of a shape, a position, and movement of a reference object to measure a depth and detecting a parallax of the reference object to generate distance information. The reconstructed 3D image may be used for classification of gestures. When the off screen gesture recognition module detects a gesture operation, the mobile device 10 may display a gesture pointer on an auxiliary display and execute a gesture event as an input command.

FIG. 16 illustrates classification of off screen gesture events on a mobile device according to some embodiments.

Referring to FIG. 16, off screen gestures may be set similarly to the touch operation illustrated in FIG. 13, but other patterns than those shown in FIG. 13 may be used for the off screen gestures. Based on the gesture events, an operation corresponding to a gesture event may be activated on an auxiliary display.

Figure 17:
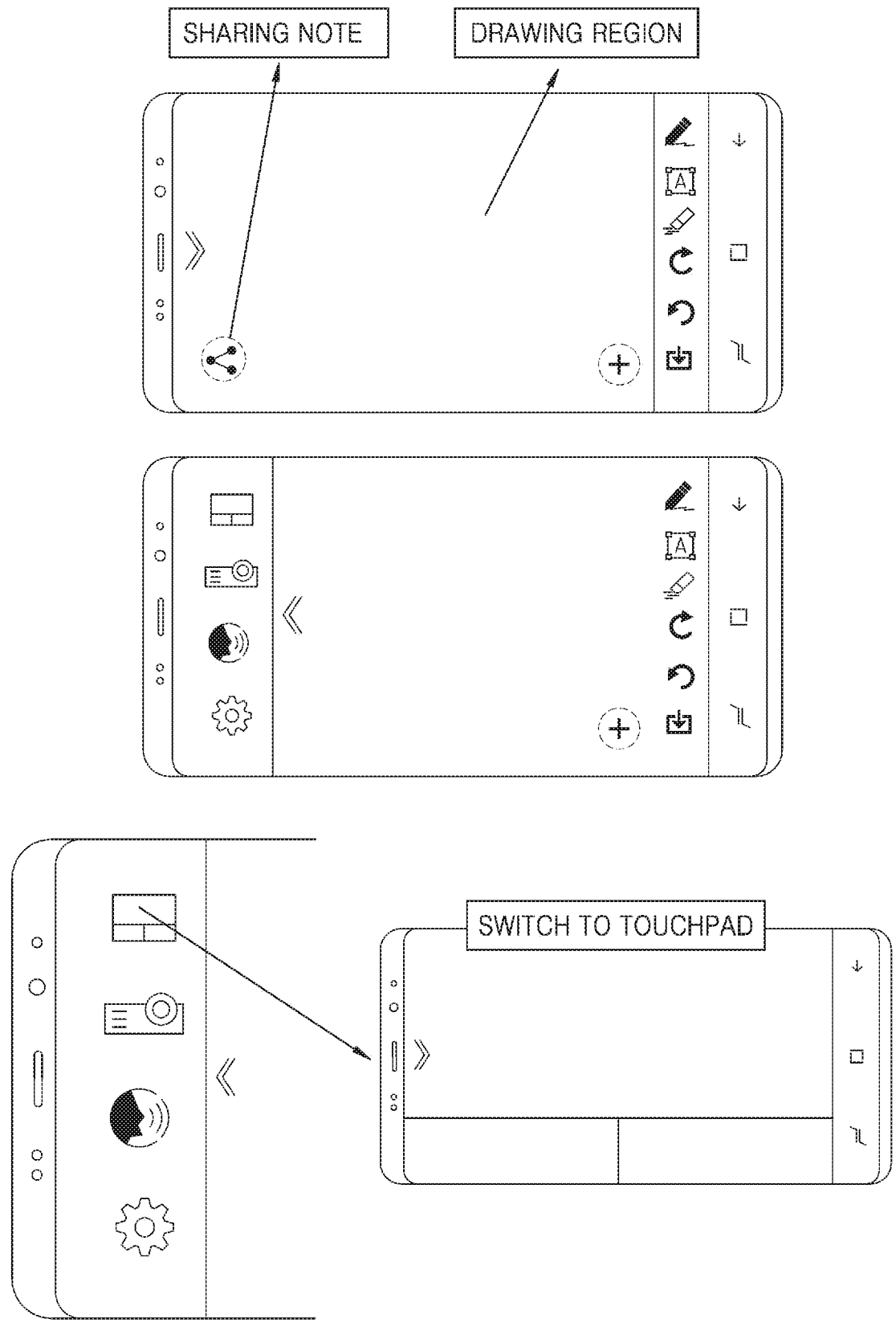
FIG. 17 illustrates a method of switching between a digitizer screen having a navigation bar for a mobile device and a screen providing another function, according to some embodiments.

FIG. 17 illustrates a method of switching between a digitizer screen having a navigation bar for the mobile device 10 and a screen providing another function, according to some embodiments.

In a docking system according to an embodiment of the present disclosure, an auxiliary display may basically display a home screen while a main display of the mobile device 10 may display a screen of a docking application including a touchpad module. The touchpad module may include a navigation bar providing a function of switching to a digitizer module, projector settings, voice command settings, and entire settings.

As shown in FIG. 17, the mobile device 10 may be used as a digitizer serving as an auxiliary input unit. For example, the mobile device 10 may perform image capture. The mobile device 10 may capture an image on an auxiliary display and store the captured image in a memory of the mobile device 10. The mobile device 10 may generate raw data in an image buffer, and then the processor may process and compress the raw data.

For example, the mobile device 10 may be used as an auxiliary input unit serving as a digitizer. The user perform editing by writing or drawing on an image captured in the auxiliary display via a main display of the mobile device 10. The image edited via the main display of the mobile device 10 may be stored in the memory of the mobile device 10 or a memory of an external device.

After the image is stored, the user may perform various tasks on the stored image. For example, the user may instruct an image of the digitizer to be displayed on the auxiliary display and perform additional tasks on the image by using an image viewer/editor application.

Figure 18:
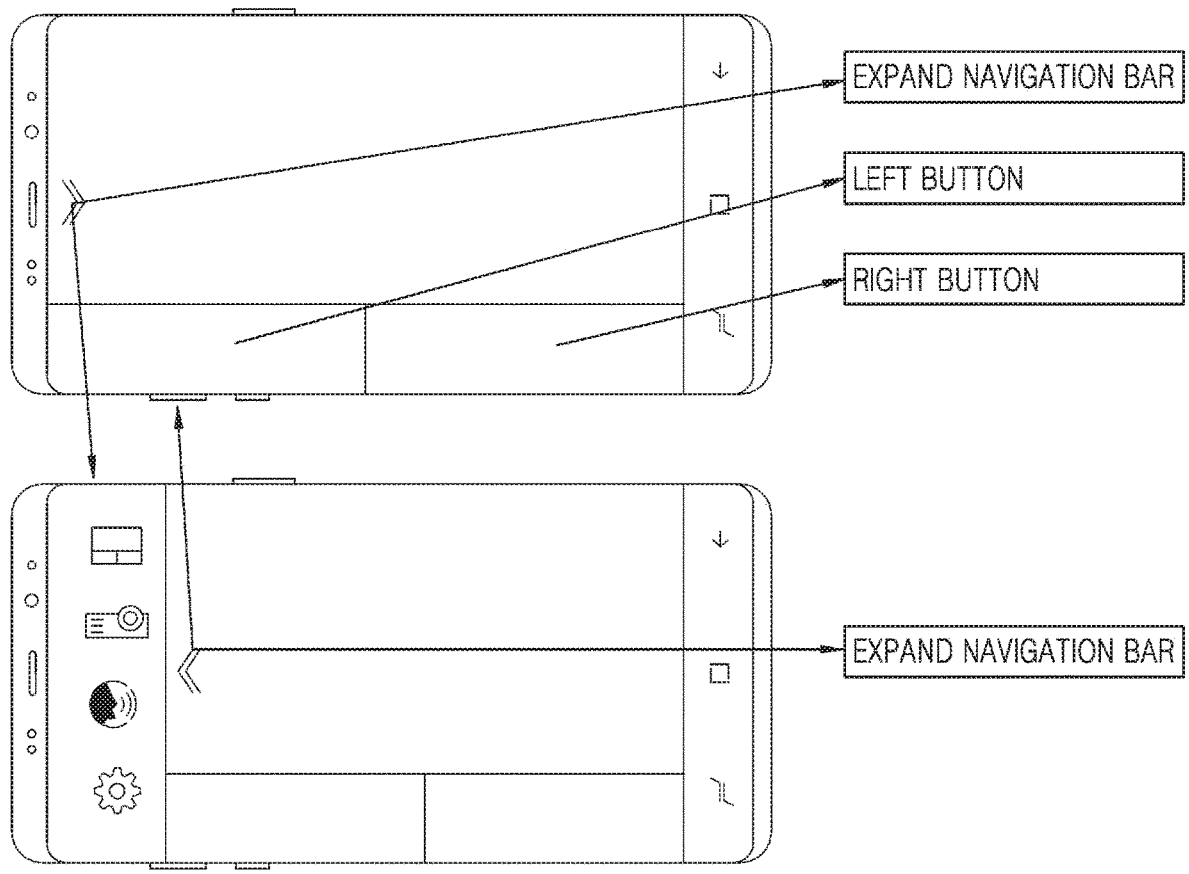
FIG. 18 illustrates an expandable navigation bar in a mobile device according to some embodiments.
Figure 19:
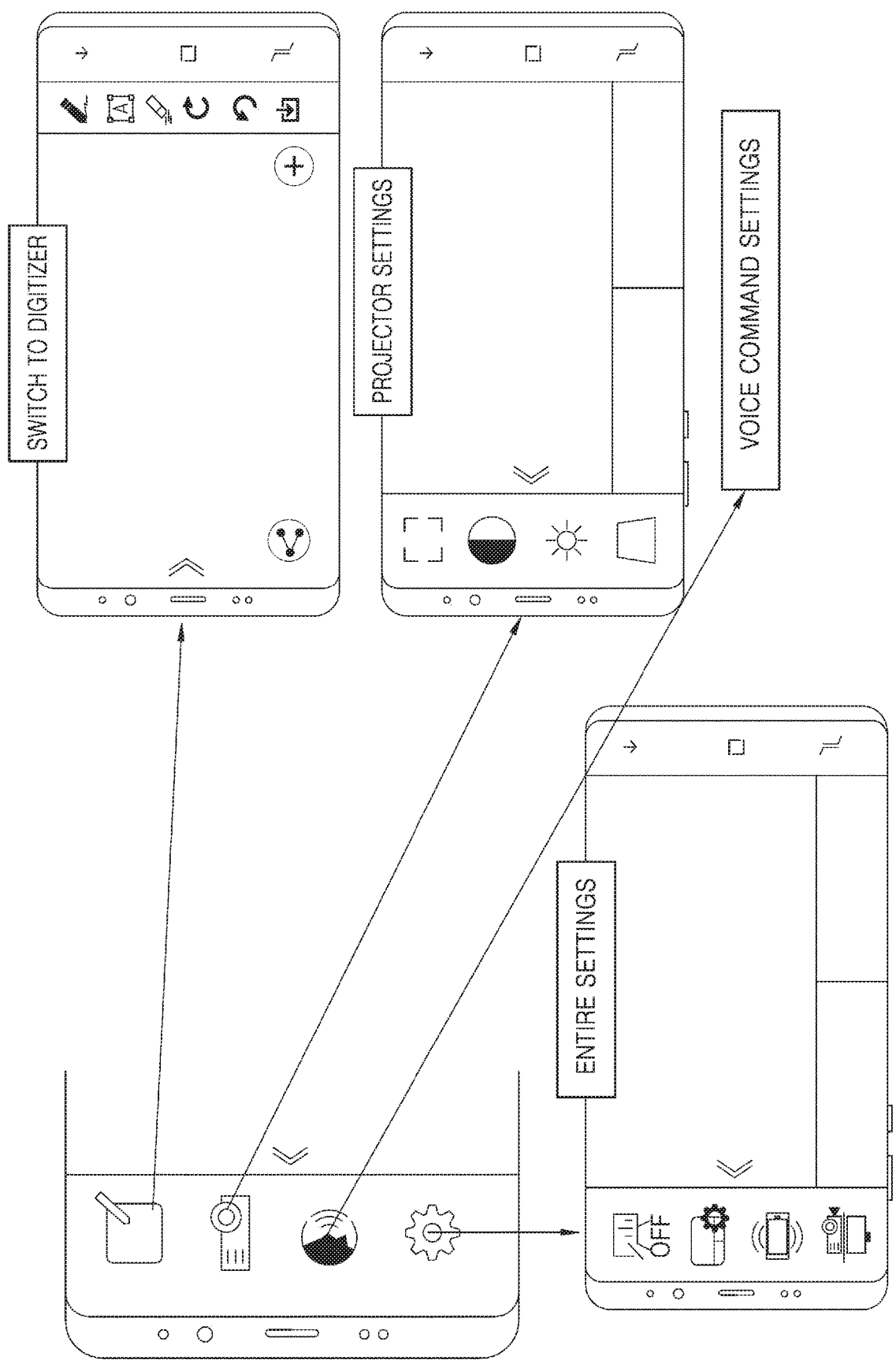
FIG. 19 illustrates a navigation bar menu on a mobile device according to some embodiments.

FIG. 18 illustrates an expandable navigation bar in the mobile device 10 according to some embodiments, and FIG. 19 illustrates a navigation bar menu on the mobile device 10 according to some embodiments.

When the user switches from a touchpad module to a digitizer module, a digitizer image is displayed on a main display of the mobile device 10 A digitizer module may provide a navigation bar to allow the user to switch back to the touchpad module or control settings for each function.

For example, via the main display of the mobile device 10, the user may set his or her pen environment, text environment, drawing erasing, and redo and undo operations, save memos, share memos, and add new blank memos, captured images, etc., from Gallery. The user may press a pen displayed on the main display to change default pen settings.

The user may, for example, add a blank memo, a screen capture on an auxiliary screen, and an image in the Gallery to a new note via the main display of the mobile device 10. When the user attempts to create a new note and an unsaved old note exists, the old note may be automatically saved before the new note is inserted.

For example, the user may store a current image via the main display of the mobile device 10 when he or she desires to switch from the digitizer module to the touchpad module. In this case, a pop-up box that asks the user whether to move to the touchpad module or cancel a switch command may appear on the main display of the mobile device 10.

For example, the user may set up the projector 125 via the main display of the mobile device 10. The user may set up the projector 125 by adjusting a focus, brightness, contrast, and projection skew of the projector 125 so that an image is suitable for characteristics of a projection region. When the focus, brightness, contrast, projection skew, etc. are adjusted, details of overall settings for the projector 125 may be displayed on an auxiliary display.

The user may, for example, set up the entire docking system via the main display of the mobile device 10. For example, settings for the docking system may include settings for activating/deactivating a presentation mode, touchpad settings, haptic feedback settings, display output switching settings, etc.

For example, the presentation mode may be used to deactivate notifications and incoming phone calls while the user is performing a presentation. For example, the touchpad settings may be used to adjust a mouse pointer speed and a touchpad module scroll speed. The haptic feedback settings may be used to adjust vibration and sound feedbacks while the user is using the touchpad module.

Figure 20:
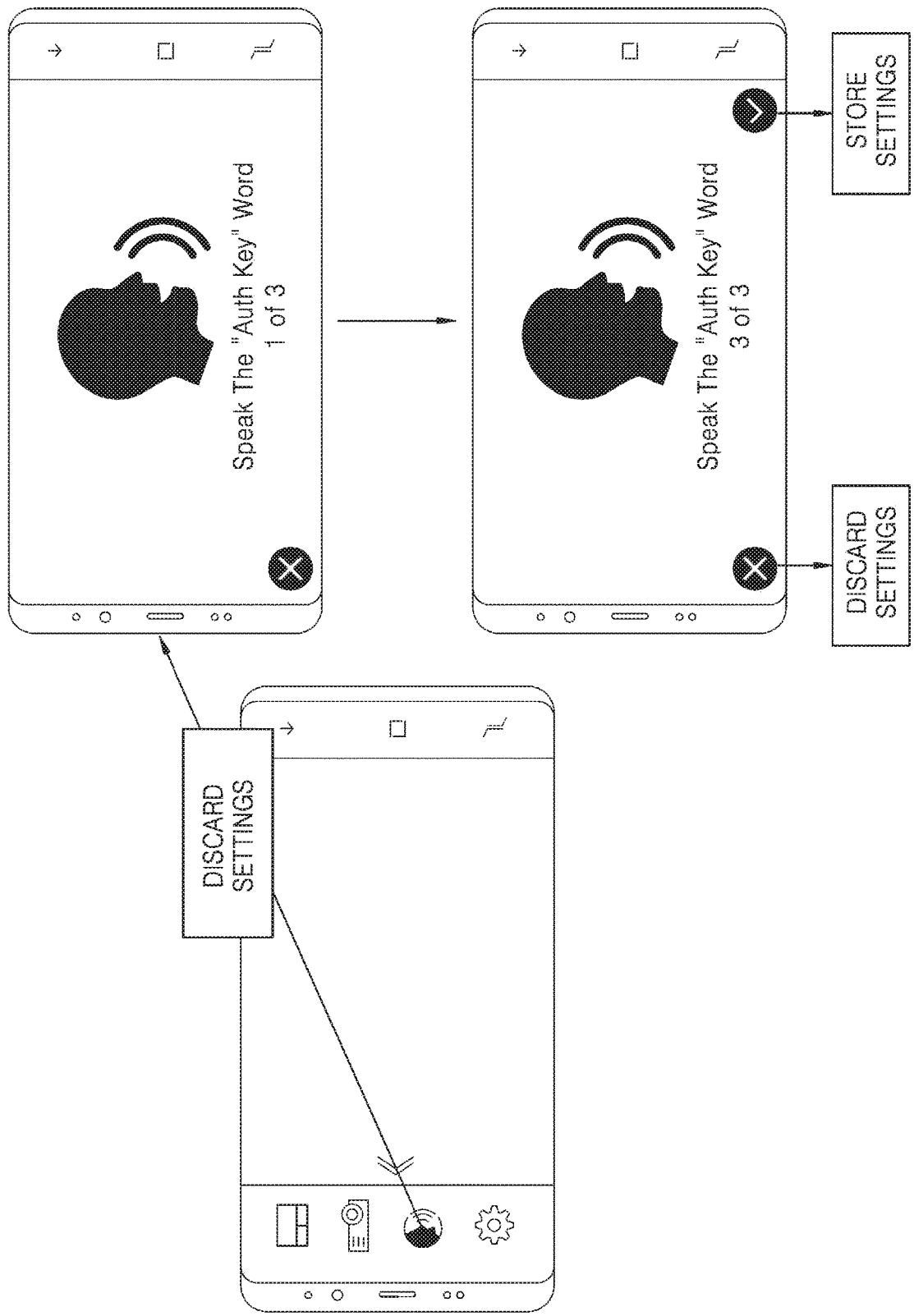
FIG. 20 illustrates voice recognition settings on a mobile device according to some embodiments.

FIG. 20 illustrates voice recognition settings on the mobile device 10 according to some embodiments.

For example, the user may perform voice recognition settings via the main display of the mobile device 10. For example, the user has to register voice features with a docking application to activate a voice recognition module. The user may register the voice features by tapping a voice recognition setting button and speaking an authentication keyword several times.

Figure 21:
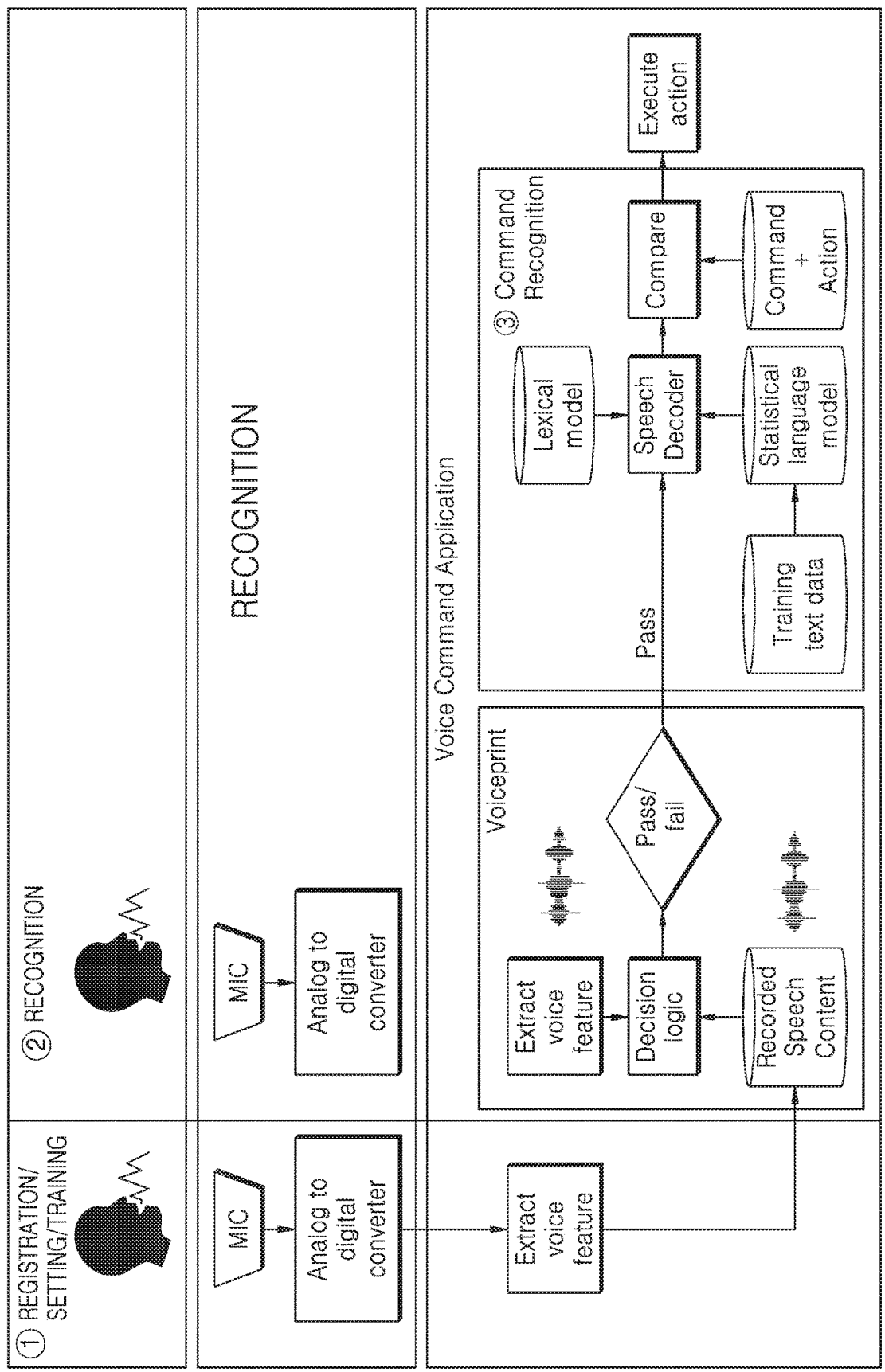
FIG. 21 illustrates an entire voice command architecture of a mobile device according to some embodiments.

FIG. 21 illustrates an entire voice command architecture of the mobile device 10 according to some embodiments.

In an operation of the docking system, only an authenticated user is allowed to issue commands to the mobile device 10 via voice commands. For user authentication, a speech recognition technology may be embedded in the mobile device 10.

Because the user's voice has unique voice features (voiceprint) that distinguish the user's voice from others' voices, a speech recognition technology for analyzing voice features may be used for user authentication.

The mobile device 10 may use a speech recognition technology to distinguish the user's voice from others' voices. The mobile device 10 may perform a command only when a command signal is input by an authenticated user and ignore a command signal input by an unauthenticated user.

Figure 22:
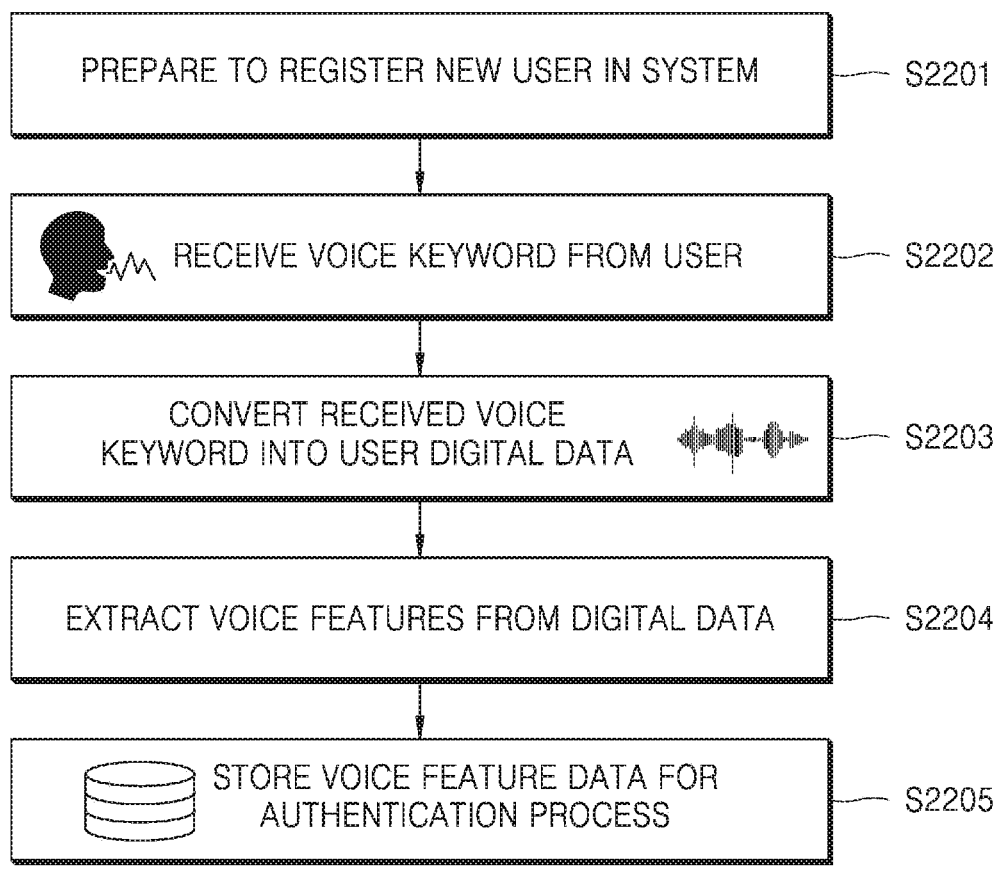
FIG. 22 is a flowchart illustrating a voice registration process performed by a mobile device, according to some embodiments.

FIG. 22 is a flowchart illustrating a voice registration process performed by the mobile device 10, according to some embodiments.

For initialization, first, the mobile device 10 needs to be set to recognize a voice of an authenticated user. In operation S2201, the mobile device 10 finishes preparing to register a new user. In operation S2202, the user has to speak a specific keyword or phrase onto the mobile device 10 to register a user's voice. The mobile device 10 may receive the spoken specific keyword or phrase from the user. The spoken keyword or phrase may be used as a user identifier for issuing a command to a voice recognition module.

In operation S2203, the spoken keyword or phrase may be converted into digital data of the user. The registration process may need to be repeated several times until the mobile device 10 accurately recognizes uniqueness of the user's voice.

Thereafter, in operation S2204, the mobile device 10 may extract voice features from the digital data of the user. When the voice features are extracted from the digital data of the user, in operation S2205, the user's voice features may be stored in a database of the mobile device 10 as an authenticated voice.

Figure 23:
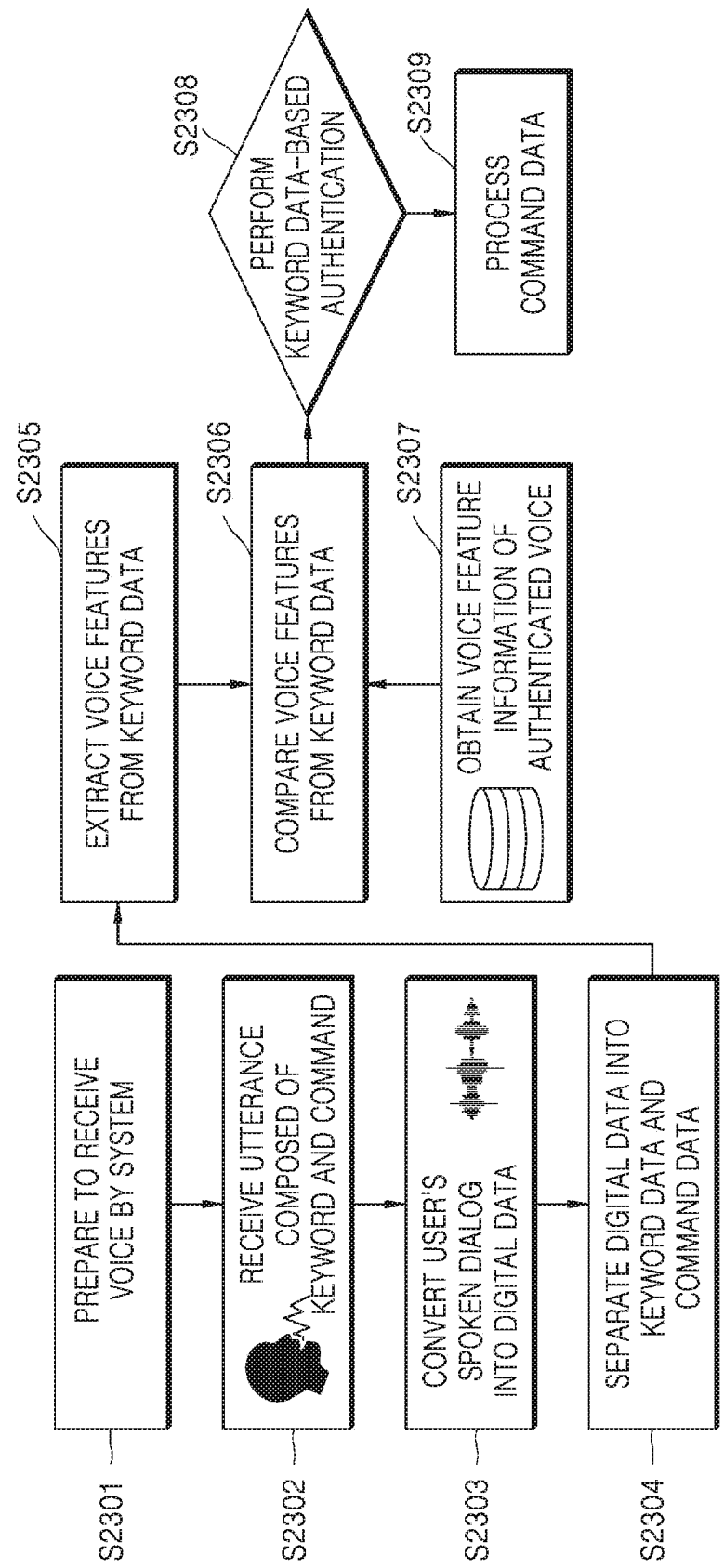
FIG. 23 is a flowchart illustrating a voice authentication process performed by a mobile device, according to some embodiments.

FIG. 23 is a flowchart illustrating a voice authentication process performed by the mobile device 10, according to some embodiments In operation S2301, the mobile device 10 finishes preparing to receive a voice from a user. When the user issues a command to the docking system, the user speaks a phrase containing a keyword and a command that need to be executed by the mobile device 10. In operation S2302, a voice recognition module of the mobile device 10 may receive a spoken voice composed of a keyword and a command from the user.

In operation S2303, the voice recognition module of the mobile device 10 may convert the user's spoken voice into digital data of the user. When the user's spoken voice is converted into the digital data of the user, in operation S2304, the voice recognition module of the mobile device 10 may separate the digital data into keyword data and command data. When the digital data includes both data regarding the keyword and the command, a user authentication process may start.

Then, in operation S2305, the voice recognition module of the mobile device 10 may extract voice features from the keyword data. The voice features may be extracted from the keyword by using the same method as in a voice registration process.

In operation S2306, the voice recognition module of the mobile device 10 may compare the voice features from the keyword data with information about voice feature information of an authenticated voice, obtained in operation S2307. The voice recognition module of the mobile device 10 may perform keyword-based user authentication by using a comparison result obtained in operation S2307. For example, the voice recognition module may determine whether to approve user authentication by comparing the comparison result with a particular threshold.

When the user authentication is approved, the voice recognition module of the mobile device 10 may process command data in operation S2309.

After the user is authenticated, the voice recognition module needs to process the command data from the user's speech into an action understandable by the computer. For example, to understand the user's command, first, the voice recognition module may compare speech data with a lexical model and a statistical language model stored in the database.

After the speech is decoded, the voice recognition module compares the decoded data with the command in the database corresponding to a specific operation. For example, this comparison may be performed using an artificial neural network. Lastly, the mobile device 10 may obtain a list of operations that need to be executed by the mobile device 10.

Figure 24:
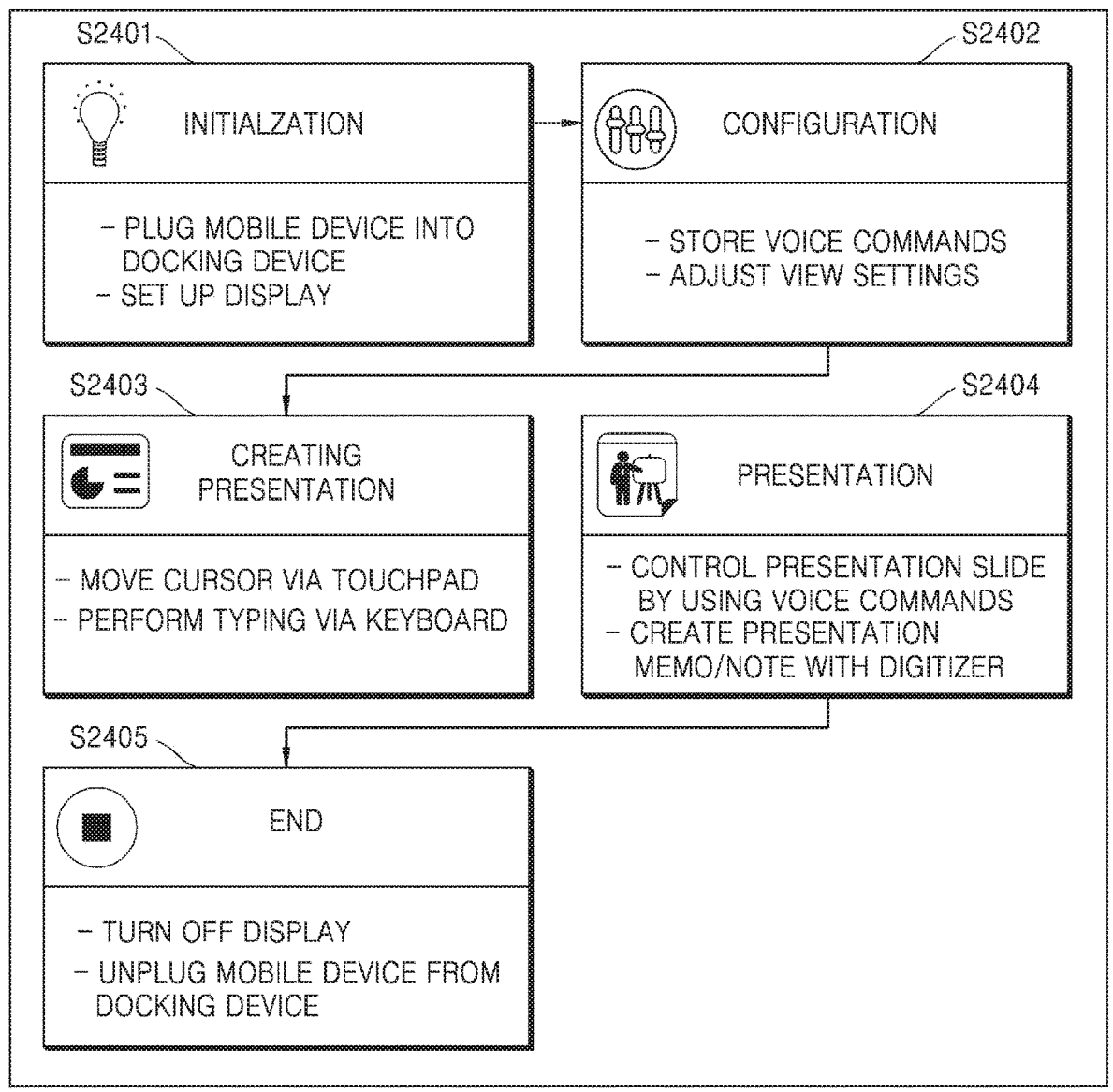
FIG. 24 illustrates a sample scenario of a business presentation according to some embodiments.

FIG. 24 illustrates a sample scenario of a business presentation according to some embodiments.

One embodiment using a docking system is a business presentation. The user may effectively perform a business presentation by using the mobile device 10 and the docking device 12.

Referring to FIG. 24, first, in operation S2401, the user may connect the mobile device 10 to the docking device 12. After the mobile device 10 is interconnected to the docking device 12, in operation S2402, the user may store voice commands issued to the mobile device 10 and adjust VIEW settings for an auxiliary display via the docking device 12.

Then, in operation S2403, the user may control a presentation screen by moving a cursor in an output image via a touchpad of the mobile device 10 and performing typing via a keyboard device.

Similarly to operation S2403, in operation S2404, the user may control a slide in a presentation by using voice commands and create a memo or note in the presentation by using the touchpad of the mobile device 10 as a digitizer.

Lastly, when the presentation is finished, in operation S2405, the user may disconnect the mobile device 10 from the docking device 12 and switch a screen of the auxiliary display to an off state.

Figure 25:
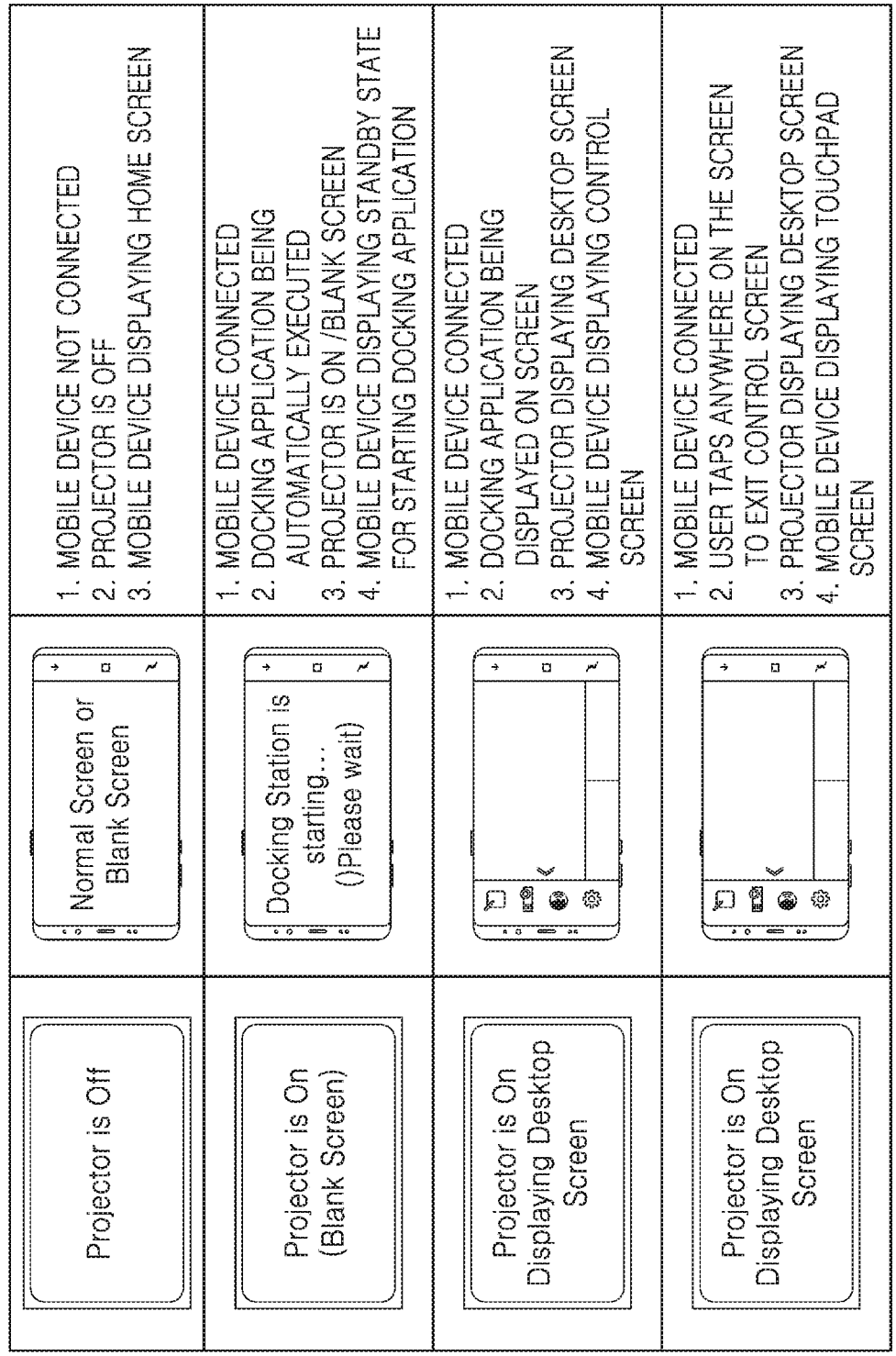
FIG. 25 illustrates an initialization process when a mobile device connects to a mobile docking device for a business presentation, according to some embodiments.

FIG. 25 illustrates an initialization process when the mobile device 10 connects to the mobile docking device 12 for a business presentation, according to some embodiments.

In detail, FIG. 25 illustrates an overview of an initialization process when connecting the mobile device 10 to the docking device 12. To start a presentation, a speaker may connect his or her mobile device 10 to an advanced mobile docking system. An initialization screen appears on the mobile device 10, and the user needs to wait until the entire initialization process is completed.

Figure 26:
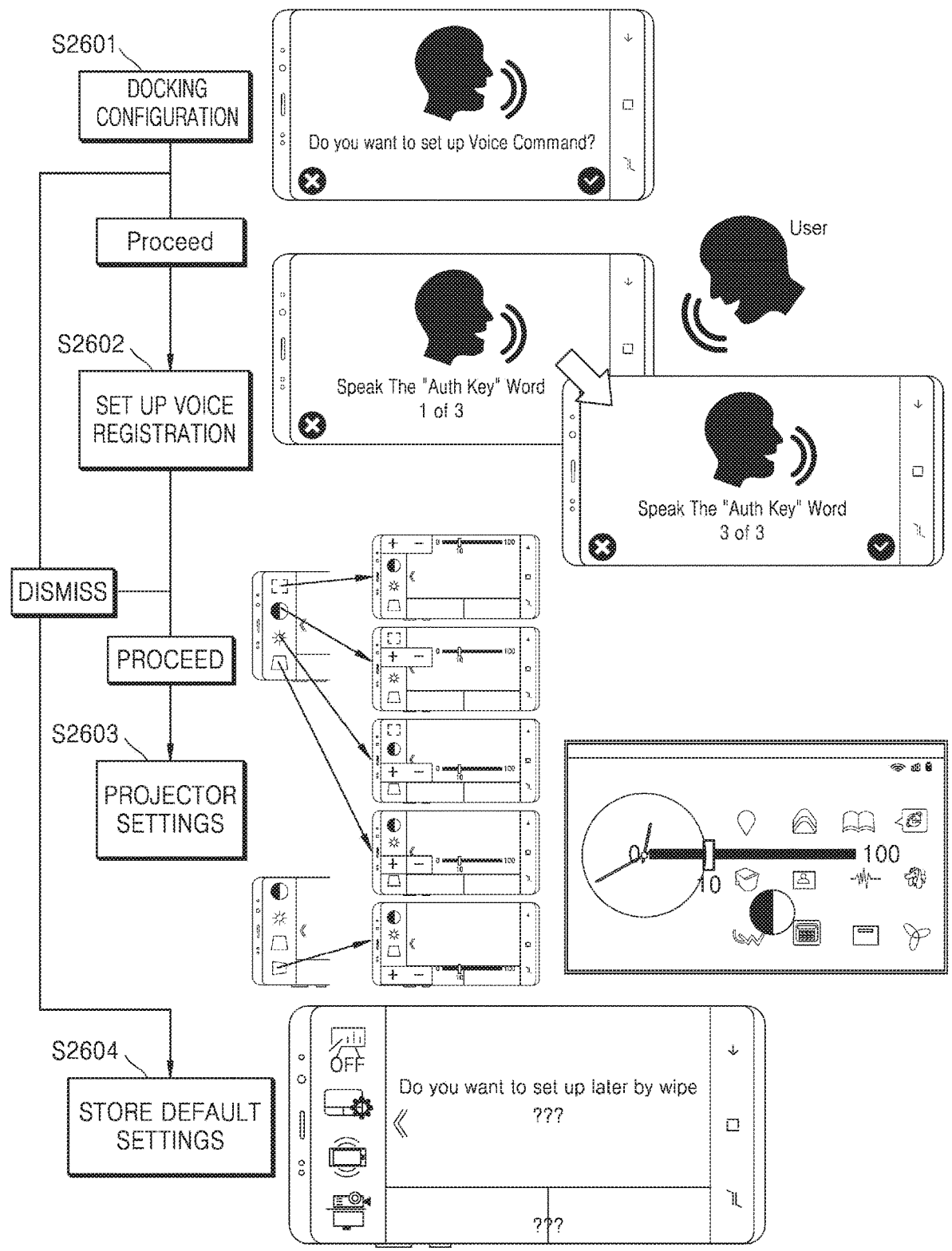
FIG. 26 is a flowchart of a method of setting up a mobile device for a business presentation, according to some embodiments.

FIG. 26 is a flowchart of a method of setting up the mobile device 10 for a business presentation, according to some embodiments.

In operation S2601, when the mobile device 10 is initially connected to the docking device 12, configuration settings for the docking system may be displayed on the main display of the mobile device 10. The user may cancel the configuration settings. When the user selects to cancel the configuration settings, default settings may be applied for all settings.

When the user selects to proceed with the configuration settings, the user may register a voice in operation S2602. To register a voice command, the user may speak a keyword several times and then store a user's voice features via authentication of the voice command.

After registering the voice, the user may set up the projector for projection in operation S2603 The user may close projector settings, and in this case, default projector settings may be applied. Voice command settings, projector settings, touchpad settings, and other settings may be made during the presentation.

After completing the voice registration and setup of the projector, the user may store details of default settings in operation S2604.

Figure 27:
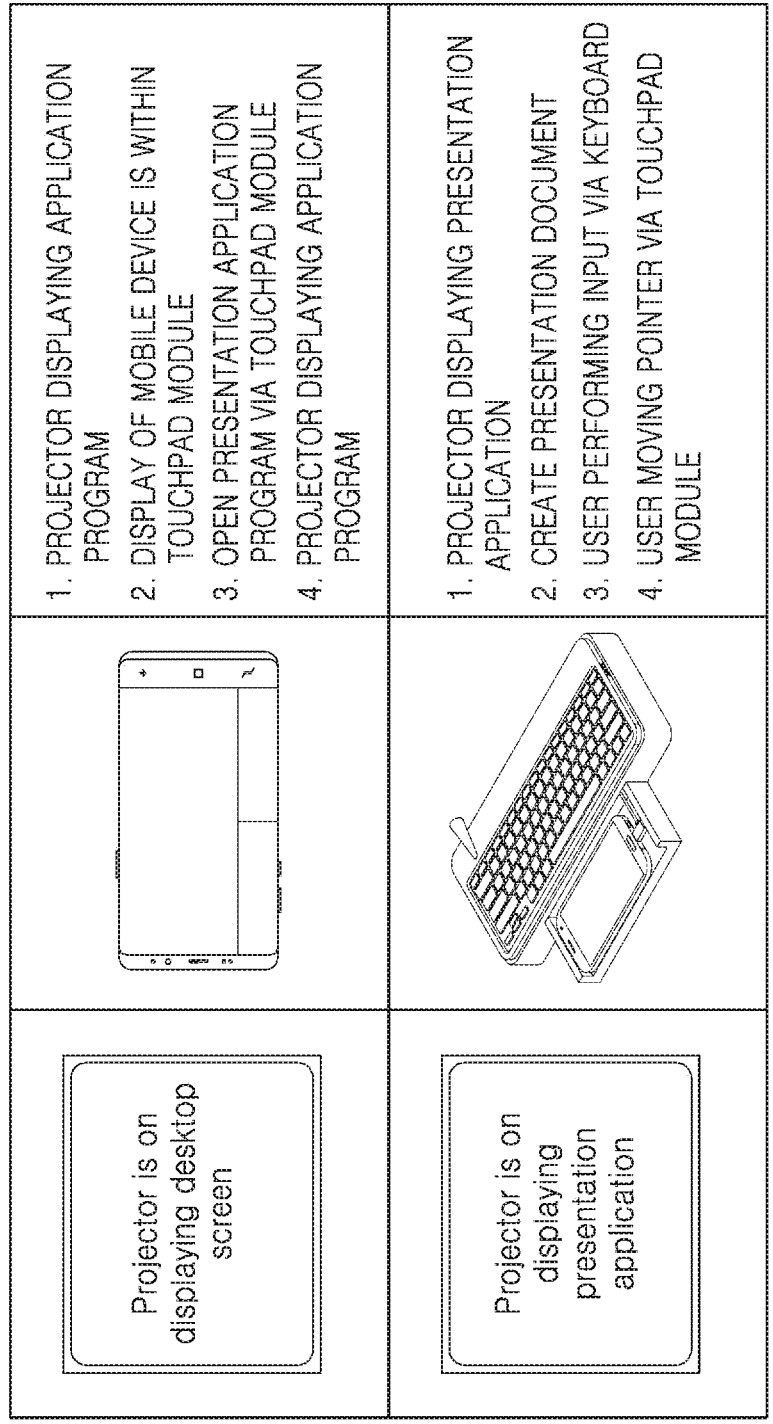
FIG. 27 illustrates a method of using a docking system for a document presentation, according to some embodiments.
Figure 28:
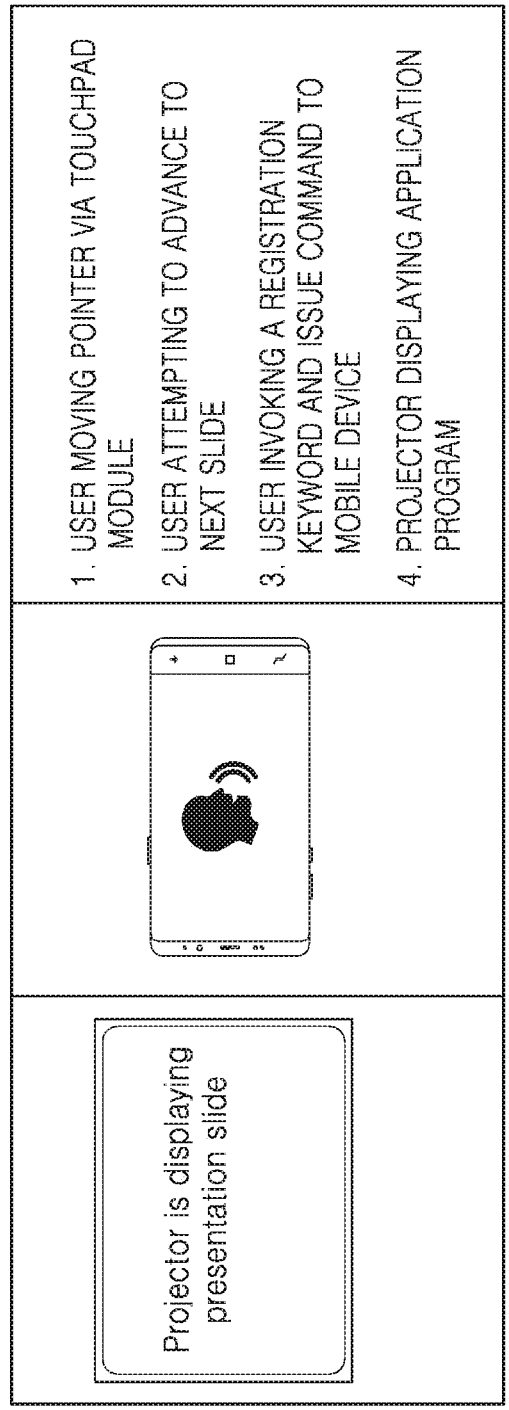
FIG. 28 illustrates an overview of a voice recognition module of a docking system for a business presentation, according to some embodiments.

FIG. 27 illustrates a method of using a docking system for a document presentation, according some embodiments.

To create a presentation document, the user needs to open a presentation application program. When the display of the mobile device 10 operates as a touchpad as an auxiliary input unit, the user may control a mouse pointer in a presentation image by using the display of the mobile device 10. Furthermore, the user may perform typing via the keyboard device 127 of the docking device 12.

Moreover, the user may advance to a next slide in a next presentation via the voice command based on the keyword configured in the voice registration operation. The user may record a note on a presentation slide by using a digitizer module.

To exit the docking system, the user may remove a connection of the mobile device 10 from the docking device 12. For example, the user may terminate driving of the docking system by removing a connection between the connector port 123 of the docking device 12 and the charging port of the mobile device 10. When the connection of the mobile device 10 is removed from the docking device 12, the driving of the docking system may be terminated, and the auxiliary display may be turned off. Furthermore, a docking application for the mobile device 10 may be terminated, and a screen of the mobile device 10 may display a home screen.

While the present disclosure has been described mainly with respect to various embodiments, those of ordinary skill in the art will appreciate that the present disclosure may be implemented in different forms without departing from the essential characteristics of the disclosure. Thus, it should be understood that the embodiments described therein should be considered in a descriptive sense only and not for purposes of limitation The scope of the present disclosure is defined not by the detailed description thereof but by the appended claims, and all differences within the scope of the appended claims and their equivalents will be construed as being included in the present disclosure.

The embodiments of the present disclosure may be written as programs executable on a computer and may be implemented in general-use digital computers that execute the programs using a computer-readable recording medium. Examples of the computer-readable recording medium include storage media such as magnetic storage media (e.g., ROM, floppy disks, hard disks, etc.) and optical recording media (e.g., CD-ROMs or DVDs).

The invention claimed is:

1. A method of controlling a docking device by a mobile device, the method comprising:
   connecting to the docking device, the docking device including a projector and a keyboard device;
   setting, in response to the mobile device connecting to the docking device, the projector as an output unit for the mobile device and setting the keyboard device as an input unit for the mobile device;
   receiving, from the docking device, an input signal provided via the keyboard device included in the docking device; and
   transmitting, to the docking device, output image data generated based on the received input signal,
   wherein the setting of the keyboard device as the input unit for the mobile device comprises, when a display of the mobile device is a touch screen:
   setting the display of the mobile device as an auxiliary input unit, and
   displaying, on the display of the mobile device, a touchpad input interface for controlling a pointer in an image projected via the projector of the docking device, and
   wherein the touchpad input interface provides user interfaces for adjusting a setting of at least one of a focus, a brightness, a contrast, and a projection skew of the projector.

2. The method of claim 1, wherein the output image data provided to the docking device is projected outside the docking device via the projector.

3. The method of claim 1, wherein the connecting to the docking device comprises connecting the mobile device to the docking device by using wired communication via a charging port of the mobile device.

4. The method of claim 1, wherein the setting of the projector as the output unit for the mobile device comprises setting a display of the mobile device as a main display and setting the projector as an auxiliary display.

5. The method of claim 4, wherein the setting of the projector as the auxiliary display comprises:
   determining whether there is an external display connected via a connector port of the docking device; and
   when the external display exists, setting the external display as the auxiliary display.

6. The method of claim 5, further comprising transmitting the output image data to the external display.

7. The method of claim 1, wherein the display of the mobile device is used as an input unit for controlling movement of a pointer in an image output from the docking device based on user input coordinates on the touch screen.

8. The method of claim 1, further comprising authenticating a user of the mobile device connected to the docking device by using a voice recognition module of the mobile device.

9. A mobile device for controlling a docking device, the mobile device comprising:
   a display;
   a connector connected to the docking device through a connector port of the docking device;
   a memory storing one or more instructions; and
   at least one processor configured to execute the stored one or more instructions to:
   connect to the docking device, the docking device including a projector and a keyboard device;
   set, in response to the mobile device connecting to the docking device, the projector as an output unit for the mobile device and set the keyboard device as an input unit for the mobile device;
   receive, from the docking device, an input signal provided via the keyboard device included in the docking device; and
   transmit, to the docking device, output image data generated based on the received input signal,
   wherein the at least one processor is further configured to, when the display of the mobile device is a touch screen:
   set the display of the mobile device as an auxiliary input unit, and
   display, on the display of the mobile device, a touchpad input interface for controlling a pointer in an image projected via the projector of the docking device, and
   wherein the touchpad input interface provides user interfaces for adjusting a setting of at least one of a focus, a brightness, a contrast, and a projection skew of the projector.

10. The mobile device of claim 9, wherein the output image data provided to the docking device is projected outside the docking device via the projector.

11. The mobile device of claim 10, wherein the at least one processor is further configured to connect the mobile device to the docking device by using wired communication via a charging port of the mobile device.

12. The mobile device of claim 10, wherein the at least one processor is further configured to set a display of the mobile device as a main display and set the projector as an auxiliary display.

13. The mobile device of claim 12, wherein the at least one processor is further configured to:
   determine whether there is an external display connected via the connector port of the docking device; and
   when the external display exists, set the external display as the auxiliary display.

14. The mobile device of claim 13, wherein the at least one processor is further configured to transmit the output image data to the external display.

15. The mobile device of claim 9, wherein the at least one processor is further configured to authenticate a user of the mobile device connected to the docking device by using a voice recognition module of the mobile device.

16. The mobile device of claim 9, wherein the display is used as an input unit for controlling movement of the pointer in the image projected via the projector of the docking device based on user input coordinates on the touch screen.

* * * * *